(12) United States Patent
Baldwin et al.

(10) Patent No.: US 11,222,626 B2
(45) Date of Patent: *Jan. 11, 2022

(54) SYSTEM AND METHOD FOR A COOPERATIVE CONVERSATIONAL VOICE USER INTERFACE

(71) Applicant: VB Assets, LLC, Bellevue, WA (US)

(72) Inventors: Larry Baldwin, Maple Valley, WA (US); Tom Freeman, Mercer Island, WA (US); Michael Tjalve, Bellevue, WA (US); Blane Ebersold, Seattle, WA (US); Chris Weider, Seattle, WA (US)

(73) Assignee: VB Assets, LLC, Bellevue, WA (US)

( * ) Notice: Subject to any disclaimer, the term of this patent is extended or adjusted under 35 U.S.C. 154(b) by 240 days.

This patent is subject to a terminal disclaimer.

(21) Appl. No.: 16/416,884

(22) Filed: May 20, 2019

(65) Prior Publication Data

US 2019/0272821 A1 Sep. 5, 2019

Related U.S. Application Data

(60) Division of application No. 14/691,445, filed on Apr. 20, 2015, now Pat. No. 10,297,249, which is a
(Continued)

(51) Int. Cl.
*G10L 15/18* (2013.01)
*G10L 25/51* (2013.01)
(Continued)

(52) U.S. Cl.
CPC .............. *G10L 15/18* (2013.01); *G06F 3/167* (2013.01); *G06F 40/30* (2020.01);
(Continued)

(58) Field of Classification Search
CPC . G10L 15/18; G10L 15/1815; G10L 15/1822; G10L 15/22; G10L 2015/223;
(Continued)

(56) References Cited

U.S. PATENT DOCUMENTS 4,430,669 A 2/1984 Cheung
4,821,027 A 4/1989 Mallory
(Continued)

FOREIGN PATENT DOCUMENTS

CN 1433554 A 7/2003
CN 1860496 A 11/2006
(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.
(Continued)

*Primary Examiner* — Eric Yen
(74) *Attorney, Agent, or Firm* — Sheppard Mullin Richter & Hampton LLP

(57) ABSTRACT

A cooperative conversational voice user interface is provided. The cooperative conversational voice user interface may build upon short-term and long-term shared knowledge to generate one or more explicit and/or implicit hypotheses about an intent of a user utterance. The hypotheses may be ranked based on varying degrees of certainty, and an adaptive response may be generated for the user. Responses may be worded based on the degrees of certainty and to frame an appropriate domain for a subsequent utterance. In one implementation, misrecognitions may be tolerated, and conversational course may be corrected based on subsequent utterances and/or responses.

18 Claims, 3 Drawing Sheets

Related U.S. Application Data continuation of application No. 13/987,645, filed on Aug. 19, 2013, now Pat. No. 9,015,049, which is a division of application No. 13/251,712, filed on Oct. 3, 2011, now Pat. No. 8,515,765, which is a continuation of application No. 11/580,926, filed on Oct. 16, 2006, now Pat. No. 8,073,681.

(51) Int. Cl.

| | | |
|---|---|---|
| G10L 15/22 | (2006.01) | |
| G06F 40/30 | (2020.01) | |
| G10L 25/63 | (2013.01) | |
| G06F 3/16 | (2006.01) | |
| G10L 17/22 | (2013.01) | |
| G10L 21/0216 | (2013.01) | |
| G10L 15/183 | (2013.01) | |
| G10L 15/06 | (2013.01) | |

(52) U.S. Cl.
 CPC ...... *G10L 15/1815* (2013.01); *G10L 15/1822* (2013.01); *G10L 15/22* (2013.01); *G10L 17/22* (2013.01); *G10L 25/51* (2013.01); *G10L 25/63* (2013.01); *G10L 15/183* (2013.01); *G10L 2015/0631* (2013.01); *G10L 2015/225* (2013.01); *G10L 2015/228* (2013.01); *G10L 2021/02166* (2013.01)

(58) Field of Classification Search
 CPC ......... G10L 15/26; G10L 17/22; G10L 25/51; G10L 25/63; G10L 2015/0631; G10L 15/183; G10L 2015/225; G10L 2015/228; G06F 3/167; G06F 40/30
 See application file for complete search history.

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,615,296 A | 3/1997 | Stanford |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder |
| 5,721,938 A | 2/1998 | Stuckey |
| 5,722,084 A | 2/1998 | Chakrin |
| 5,729,659 A | 3/1998 | Potter |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,860,059 A | 1/1999 | Aust |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,898,760 A | 4/1999 | Smets |
| 5,899,991 A | 5/1999 | Karch |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,982,906 A | 11/1999 | Ono |
| 5,983,190 A | 11/1999 | Trowerll |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,057 A | 6/2000 | Narayanan |
| 6,076,059 A | 6/2000 | Glickman |
| 6,078,886 A | 6/2000 | Dragosh |
| 6,081,774 A | 6/2000 | deHita |
| 6,081,779 A | 6/2000 | Stefan |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |

(56) References Cited

U.S. PATENT DOCUMENTS

| | | | |
|---|---|---|---|
| 6,134,235 A | 10/2000 | Goldman | |
| 6,144,667 A | 11/2000 | Doshi | |
| 6,144,938 A | 11/2000 | Surace | |
| 6,154,526 A | 11/2000 | Dahlke | |
| 6,160,883 A | 12/2000 | Jackson | |
| 6,167,377 A | 12/2000 | Gillick | |
| 6,173,250 B1 | 1/2001 | Jong | |
| 6,173,266 B1 | 1/2001 | Marx | |
| 6,173,279 B1 | 1/2001 | Levin | |
| 6,175,858 B1 | 1/2001 | Bulfer | |
| 6,185,535 B1 | 2/2001 | Hedin | |
| 6,188,982 B1 | 2/2001 | Chiang | |
| 6,192,110 B1 | 2/2001 | Abella | |
| 6,192,338 B1 | 2/2001 | Haszto | |
| 6,195,634 B1 | 2/2001 | Dudemaine | |
| 6,195,651 B1 | 2/2001 | Handel | |
| 6,199,043 B1 | 3/2001 | Happ | |
| 6,208,964 B1 | 3/2001 | Sabourin | |
| 6,208,972 B1 | 3/2001 | Grant | |
| 6,219,346 B1 | 4/2001 | Maxemchuk | |
| 6,219,643 B1 | 4/2001 | Cohen | |
| 6,219,645 B1 | 4/2001 | Byers | |
| 6,226,612 B1 | 5/2001 | Srenger | |
| 6,233,556 B1 | 5/2001 | Teunen | |
| 6,233,559 B1 | 5/2001 | Balakrishnan | |
| 6,233,561 B1 | 5/2001 | Junqua | |
| 6,236,968 B1 | 5/2001 | Kanevsky | |
| 6,243,679 B1 | 6/2001 | Mohri | |
| 6,246,981 B1 | 6/2001 | Papineni | |
| 6,246,990 B1 | 6/2001 | Happ | |
| 6,266,636 B1 | 7/2001 | Kosaka | |
| 6,269,336 B1 | 7/2001 | Ladd | |
| 6,272,455 B1 | 8/2001 | Hoshen | |
| 6,272,461 B1 | 8/2001 | Meredith | |
| 6,275,231 B1 | 8/2001 | Obradovich | |
| 6,278,377 B1 | 8/2001 | DeLine | |
| 6,278,968 B1 | 8/2001 | Franz | |
| 6,286,002 B1 | 9/2001 | Axaopoulos | |
| 6,288,319 B1 | 9/2001 | Catona | |
| 6,292,767 B1 | 9/2001 | Jackson | |
| 6,301,560 B1 | 10/2001 | Masters | |
| 6,308,151 B1 | 10/2001 | Smith | |
| 6,311,159 B1 | 10/2001 | VanTichelen | |
| 6,314,402 B1 | 11/2001 | Monaco | |
| 6,321,196 B1 | 11/2001 | Franceschi | |
| 6,356,869 B1 | 3/2002 | Chapados | |
| 6,362,748 B1 | 3/2002 | Huang | |
| 6,366,882 B1 | 4/2002 | Bijl | |
| 6,366,886 B1 | 4/2002 | Dragosh | |
| 6,374,214 B1 | 4/2002 | Friedland | |
| 6,374,226 B1 | 4/2002 | Hunt | |
| 6,377,913 B1 | 4/2002 | Coffman | |
| 6,377,919 B1 | 4/2002 | Burnett | |
| 6,381,535 B1 | 4/2002 | Durocher | |
| 6,385,596 B1 | 5/2002 | Wiser | |
| 6,385,646 B1 | 5/2002 | Brown | |
| 6,389,398 B1 | 5/2002 | Lustgarten | |
| 6,393,403 B1 | 5/2002 | Majaniemi | |
| 6,393,428 B1 | 5/2002 | Miller | |
| 6,393,460 B1 * | 5/2002 | Gruen | G06Q 10/107 709/204 |
| 6,397,181 B1 | 5/2002 | Li | |
| 6,404,878 B1 | 6/2002 | Jackson | |
| 6,405,170 B1 | 6/2002 | Phillips | |
| 6,408,272 B1 | 6/2002 | White | |
| 6,411,810 B1 | 6/2002 | Maxemchuk | |
| 6,411,893 B2 | 6/2002 | Ruhl | |
| 6,415,257 B1 | 7/2002 | Junqua | |
| 6,418,210 B1 | 7/2002 | Sayko | |
| 6,420,975 B1 | 7/2002 | DeLine | |
| 6,429,813 B2 | 8/2002 | Feigen | |
| 6,430,285 B1 | 8/2002 | Bauer | |
| 6,430,531 B1 | 8/2002 | Polish | |
| 6,434,523 B1 | 8/2002 | Monaco | |
| 6,434,524 B1 | 8/2002 | Weber | |
| 6,434,529 B1 | 8/2002 | Walker | |
| 6,442,522 B1 | 8/2002 | Carberry | |
| 6,446,114 B1 | 9/2002 | Bulfer | |
| 6,453,153 B1 | 9/2002 | Bowker | |
| 6,453,292 B2 | 9/2002 | Ramaswamy | |
| 6,456,711 B1 | 9/2002 | Cheung | |
| 6,456,974 B1 | 9/2002 | Baker | |
| 6,466,654 B1 | 10/2002 | Cooper | |
| 6,466,899 B1 | 10/2002 | Yano | |
| 6,470,315 B1 | 10/2002 | Netsch | |
| 6,487,494 B2 | 11/2002 | Odinak | |
| 6,487,495 B1 | 11/2002 | Gale | |
| 6,498,797 B1 | 12/2002 | Anerousis | |
| 6,499,013 B1 | 12/2002 | Weber | |
| 6,501,833 B2 | 12/2002 | Phillips | |
| 6,501,834 B1 | 12/2002 | Milewski | |
| 6,505,155 B1 | 1/2003 | Vanbuskirk | |
| 6,510,417 B1 | 1/2003 | Woods | |
| 6,513,006 B2 | 1/2003 | Howard | |
| 6,522,746 B1 | 2/2003 | Marchok | |
| 6,523,061 B1 | 2/2003 | Halverson | |
| 6,526,335 B1 | 2/2003 | Treyz | |
| 6,532,444 B1 | 3/2003 | Weber | |
| 6,539,348 B1 | 3/2003 | Bond | |
| 6,549,629 B2 | 4/2003 | Finn | |
| 6,553,372 B1 | 4/2003 | Brassell | |
| 6,556,970 B1 | 4/2003 | Sasaki | |
| 6,556,973 B1 | 4/2003 | Lewin | |
| 6,560,576 B1 | 5/2003 | Cohen | |
| 6,560,590 B1 | 5/2003 | Shwe | |
| 6,567,778 B1 | 5/2003 | ChaoChang | |
| 6,567,797 B1 | 5/2003 | Schuetze | |
| 6,567,805 B1 | 5/2003 | Johnson | |
| 6,570,555 B1 | 5/2003 | Prevost | |
| 6,570,964 B1 | 5/2003 | Murveit | |
| 6,571,279 B1 | 5/2003 | Herz | |
| 6,574,597 B1 | 6/2003 | Mohri | |
| 6,574,624 B1 | 6/2003 | Johnson | |
| 6,578,022 B1 | 6/2003 | Foulger | |
| 6,581,103 B1 | 6/2003 | Dengler | |
| 6,584,439 B1 | 6/2003 | Geilhufe | |
| 6,587,858 B1 | 7/2003 | Strazza | |
| 6,591,185 B1 | 7/2003 | Polidi | |
| 6,591,239 B1 | 7/2003 | McCall | |
| 6,594,257 B1 | 7/2003 | Doshi | |
| 6,594,367 B1 | 7/2003 | Marash | |
| 6,598,018 B1 | 7/2003 | Junqua | |
| 6,601,026 B2 | 7/2003 | Appelt | |
| 6,601,029 B1 | 7/2003 | Pickering | |
| 6,604,075 B1 | 8/2003 | Brown | |
| 6,604,077 B2 | 8/2003 | Dragosh | |
| 6,606,598 B1 | 8/2003 | Holthouse | |
| 6,611,692 B2 | 8/2003 | Raffel | |
| 6,614,773 B1 | 9/2003 | Maxemchuk | |
| 6,615,172 B1 | 9/2003 | Bennett | |
| 6,622,119 B1 | 9/2003 | Ramaswamy | |
| 6,629,066 B1 | 9/2003 | Jackson | |
| 6,631,346 B1 | 10/2003 | Karaorman | |
| 6,631,351 B1 | 10/2003 | Ramachandran | |
| 6,633,846 B1 | 10/2003 | Bennett | |
| 6,636,790 B1 | 10/2003 | Lightner | |
| 6,643,620 B1 | 11/2003 | Contolini | |
| 6,647,363 B2 | 11/2003 | Claassen | |
| 6,650,747 B1 | 11/2003 | Bala | |
| 6,658,388 B1 | 12/2003 | Kleindienst | |
| 6,678,680 B1 | 1/2004 | Woo | |
| 6,681,206 B1 | 1/2004 | Gorin | |
| 6,691,151 B1 | 2/2004 | Cheyer | |
| 6,701,294 B1 | 3/2004 | Ball | |
| 6,704,396 B2 | 3/2004 | Parolkar | |
| 6,704,576 B1 | 3/2004 | Brachman | |
| 6,704,708 B1 | 3/2004 | Pickering | |
| 6,707,421 B1 | 3/2004 | Drury | |
| 6,708,150 B1 | 3/2004 | Hirayama | |
| 6,721,001 B1 | 4/2004 | Berstis | |
| 6,721,633 B2 | 4/2004 | Funk | |
| 6,721,706 B1 | 4/2004 | Strubbe | |
| 6,726,636 B2 | 4/2004 | DerGhazarian | |
| 6,732,088 B1 | 5/2004 | Glance | |

(56) References Cited

U.S. PATENT DOCUMENTS

| | | |
|---|---|---|
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,362 B1 | 6/2004 | Cooper |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,823,308 B2 | 11/2004 | Alexander |
| 6,829,603 B1 | 12/2004 | Chai |
| 6,832,230 B1 | 12/2004 | Zilliacus |
| 6,833,848 B1 | 12/2004 | Wolff |
| 6,839,896 B2 | 1/2005 | Coffman |
| 6,850,603 B1 | 2/2005 | Eberle |
| 6,856,990 B2 | 2/2005 | Barile |
| 6,859,776 B1 | 2/2005 | Cohen |
| 6,865,481 B2 | 3/2005 | Kawazoe |
| 6,868,380 B1 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B2 | 4/2005 | Wolf |
| 6,877,134 B1 | 4/2005 | Fuller |
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,983 B1 | 12/2005 | Fortescue |
| 6,975,993 B1 | 12/2005 | Keiller |
| 6,980,092 B2 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,031,908 B1 | 4/2006 | Huang |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,072,888 B1 * | 7/2006 | Perkins ............... G06F 16/9535 707/733 |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B2 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,315 B2 | 12/2006 | Balan |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 * | 3/2007 | Gupta ..................... G06F 3/167 704/270.1 |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,586 B1 | 5/2008 | Partovi |
| 7,376,645 B2 | 5/2008 | Bernard |
| 7,380,250 B2 | 5/2008 | Schechter |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,430,510 B1 * | 9/2008 | De Fabbrizio .......... G10L 15/22 704/275 |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |

(56) References Cited

U.S. PATENT DOCUMENTS

| | | |
|---|---|---|
| 7,502,672 B1 | 3/2009 | Kolls |
| 7,502,730 B2 | 3/2009 | Wang |
| 7,502,738 B2 | 3/2009 | Kennewick |
| 7,512,906 B1 | 3/2009 | Baier |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,606,712 B1 | 10/2009 | Smith |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,913 B1 | 6/2010 | Lee |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,774,333 B2 | 8/2010 | Colledge |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,078,502 B2 | 12/2011 | Hao |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,190,436 B2 | 5/2012 | Bangalore |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,972,354 B1 | 3/2015 | Telang |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,318,108 B2 | 4/2016 | Gruber |
| 9,406,078 B2 | 8/2016 | Freeman |
| 9,443,514 B1 | 9/2016 | Taubman |
| 9,502,025 B2 | 11/2016 | Kennewick |
| 9,626,703 B2 | 4/2017 | Kennewick, Sr. |
| 9,711,143 B2 | 7/2017 | Kennewick |
| 10,089,984 B2 | 10/2018 | Kennewick |
| 2001/0011336 A1 | 8/2001 | Sitka |
| 2001/0014857 A1 | 8/2001 | Wang |
| 2001/0021905 A1 | 9/2001 | Burnett |
| 2001/0039492 A1 | 11/2001 | Nemoto |
| 2001/0041977 A1* | 11/2001 | Aoyagi ............... G06F 3/16 704/246 |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |

(56) References Cited

U.S. PATENT DOCUMENTS

| | | |
|---|---|---|
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1* | 9/2002 | Ross .................. G10L 15/1822 704/275 |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0178003 A1 | 11/2002 | Gehrke |
| 2002/0184373 A1 | 12/2002 | Maes |
| 2002/0188455 A1 | 12/2002 | Shioda |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0154082 A1 | 8/2003 | Toguri |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182123 A1* | 9/2003 | Mitsuyoshi ............. G10L 17/26 704/270 |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0216919 A1* | 11/2003 | Roushar .................. G06F 40/30 704/260 |
| 2003/0225825 A1 | 12/2003 | Healey |
| 2003/0233230 A1 | 12/2003 | Ammicht |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1* | 3/2004 | Kennewick ............. G10L 15/22 704/5 |
| 2004/0093567 A1 | 5/2004 | Schabes |
| 2004/0098245 A1 | 5/2004 | Walker |
| 2004/0102977 A1 | 5/2004 | Metzler |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0128514 A1 | 7/2004 | Rhoads |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199387 A1 | 10/2004 | Wang |
| 2004/0199389 A1 | 10/2004 | Geiger |
| 2004/0201607 A1 | 10/2004 | Mulvey |
| 2004/0204939 A1 | 10/2004 | Daben |
| 2004/0205671 A1 | 10/2004 | Sukehiro |
| 2004/0220800 A1 | 11/2004 | Kong |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0043956 A1* | 2/2005 | Aoyama .................. G10L 15/22 704/276 |
| 2005/0060142 A1 | 3/2005 | Visser |
| 2005/0080632 A1 | 4/2005 | Endo |
| 2005/0080821 A1 | 4/2005 | Breil |
| 2005/0102282 A1 | 5/2005 | Linden |
| 2005/0114116 A1 | 5/2005 | Fiedler |
| 2005/0114781 A1* | 5/2005 | Brownholtz .......... G06F 3/0482 715/733 |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0138168 A1 | 6/2005 | Hoffman |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0169441 A1 | 8/2005 | Yacoub |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0240412 A1 | 10/2005 | Fujita |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |

(56) References Cited

U.S. PATENT DOCUMENTS

| | | | |
|---|---|---|---|
| 2006/0046740 A1 | 3/2006 | Johnson | |
| 2006/0047362 A1* | 3/2006 | Aoyama | G10L 15/22 700/245 |
| 2006/0047509 A1 | 3/2006 | Ding | |
| 2006/0072738 A1 | 4/2006 | Louis | |
| 2006/0074670 A1 | 4/2006 | Weng | |
| 2006/0074671 A1 | 4/2006 | Farmaner | |
| 2006/0080098 A1 | 4/2006 | Campbell | |
| 2006/0100851 A1 | 5/2006 | Schonebeck | |
| 2006/0106769 A1* | 5/2006 | Gibbs | G06F 16/951 |
| 2006/0129409 A1 | 6/2006 | Mizutani | |
| 2006/0130002 A1 | 6/2006 | Hirayama | |
| 2006/0149633 A1 | 7/2006 | Voisin | |
| 2006/0182085 A1 | 8/2006 | Sweeney | |
| 2006/0206310 A1 | 9/2006 | Ravikumar | |
| 2006/0217133 A1 | 9/2006 | Christenson | |
| 2006/0236343 A1 | 10/2006 | Chang | |
| 2006/0242017 A1 | 10/2006 | Libes | |
| 2006/0247919 A1 | 11/2006 | Specht | |
| 2006/0253247 A1 | 11/2006 | de Silva | |
| 2006/0253281 A1 | 11/2006 | Letzt | |
| 2006/0285662 A1 | 12/2006 | Yin | |
| 2007/0011159 A1 | 1/2007 | Hillis | |
| 2007/0033005 A1 | 2/2007 | Di Cristo | |
| 2007/0033020 A1 | 2/2007 | Francois | |
| 2007/0033526 A1 | 2/2007 | Thompson | |
| 2007/0038436 A1 | 2/2007 | Cristo | |
| 2007/0038445 A1 | 2/2007 | Helbing | |
| 2007/0043569 A1 | 2/2007 | Potter | |
| 2007/0043574 A1 | 2/2007 | Coffman | |
| 2007/0043868 A1 | 2/2007 | Kumar | |
| 2007/0050191 A1 | 3/2007 | Weider | |
| 2007/0050279 A1 | 3/2007 | Huang | |
| 2007/0055525 A1 | 3/2007 | Kennewick | |
| 2007/0060114 A1 | 3/2007 | Ramer | |
| 2007/0061067 A1 | 3/2007 | Zeinstra | |
| 2007/0061735 A1 | 3/2007 | Hoffberg | |
| 2007/0067310 A1 | 3/2007 | Gupta | |
| 2007/0073544 A1 | 3/2007 | Millett | |
| 2007/0078708 A1 | 4/2007 | Yu | |
| 2007/0078709 A1 | 4/2007 | Rajaram | |
| 2007/0078814 A1 | 4/2007 | Flowers | |
| 2007/0094003 A1 | 4/2007 | Huang | |
| 2007/0100797 A1* | 5/2007 | Thun | G06F 16/904 |
| 2007/0106499 A1 | 5/2007 | Dahlgren | |
| 2007/0112555 A1 | 5/2007 | Lavi | |
| 2007/0112630 A1 | 5/2007 | Lau | |
| 2007/0118357 A1 | 5/2007 | Kasravi | |
| 2007/0124057 A1 | 5/2007 | Prieto | |
| 2007/0135101 A1 | 6/2007 | Ramati | |
| 2007/0146833 A1 | 6/2007 | Satomi | |
| 2007/0162296 A1 | 7/2007 | Altberg | |
| 2007/0174258 A1 | 7/2007 | Jones | |
| 2007/0179778 A1 | 8/2007 | Gong | |
| 2007/0185859 A1 | 8/2007 | Flowers | |
| 2007/0186165 A1 | 8/2007 | Maislos | |
| 2007/0192309 A1 | 8/2007 | Fischer | |
| 2007/0198267 A1 | 8/2007 | Jones | |
| 2007/0203699 A1 | 8/2007 | Nagashima | |
| 2007/0203736 A1 | 8/2007 | Ashton | |
| 2007/0208732 A1 | 9/2007 | Flowers | |
| 2007/0214182 A1 | 9/2007 | Rosenberg | |
| 2007/0250901 A1 | 10/2007 | McIntire | |
| 2007/0265850 A1 | 11/2007 | Kennewick | |
| 2007/0266257 A1 | 11/2007 | Camaisa | |
| 2007/0276651 A1 | 11/2007 | Bliss | |
| 2007/0294615 A1 | 12/2007 | Sathe | |
| 2007/0299824 A1 | 12/2007 | Pan | |
| 2008/0010135 A1 | 1/2008 | Schrock | |
| 2008/0014908 A1 | 1/2008 | Vasant | |
| 2008/0032622 A1 | 2/2008 | Kopra | |
| 2008/0034032 A1 | 2/2008 | Healey | |
| 2008/0046311 A1 | 2/2008 | Shahine | |
| 2008/0059188 A1 | 3/2008 | Konopka | |
| 2008/0065386 A1 | 3/2008 | Cross | |
| 2008/0065389 A1 | 3/2008 | Cross | |
| 2008/0065390 A1 | 3/2008 | Ativanichayaphong | |
| 2008/0086455 A1 | 4/2008 | Meisels | |
| 2008/0091406 A1 | 4/2008 | Baldwin | |
| 2008/0103761 A1 | 5/2008 | Printz | |
| 2008/0103781 A1 | 5/2008 | Wasson | |
| 2008/0104071 A1 | 5/2008 | Pragada | |
| 2008/0109285 A1 | 5/2008 | Reuther | |
| 2008/0115163 A1 | 5/2008 | Gilboa | |
| 2008/0126091 A1 | 5/2008 | Clark | |
| 2008/0126284 A1 | 5/2008 | Forbes | |
| 2008/0133215 A1 | 6/2008 | Sarukkai | |
| 2008/0140385 A1 | 6/2008 | Mahajan | |
| 2008/0147396 A1 | 6/2008 | Wang | |
| 2008/0147410 A1 | 6/2008 | Odinak | |
| 2008/0147637 A1 | 6/2008 | Li | |
| 2008/0154604 A1 | 6/2008 | Sathish | |
| 2008/0162471 A1 | 7/2008 | Bernard | |
| 2008/0177530 A1 | 7/2008 | Cross | |
| 2008/0184164 A1* | 7/2008 | Di Fabbrizio | G06F 3/167 715/809 |
| 2008/0189110 A1 | 8/2008 | Freeman | |
| 2008/0189187 A1 | 8/2008 | Hao | |
| 2008/0228496 A1 | 9/2008 | Yu | |
| 2008/0235023 A1 | 9/2008 | Kennewick | |
| 2008/0235027 A1 | 9/2008 | Cross | |
| 2008/0269958 A1 | 10/2008 | Filev | |
| 2008/0270135 A1 | 10/2008 | Goel | |
| 2008/0270224 A1 | 10/2008 | Portman | |
| 2008/0294437 A1 | 11/2008 | Nakano | |
| 2008/0294994 A1 | 11/2008 | Kruger | |
| 2008/0306743 A1 | 12/2008 | Di Fabbrizio | |
| 2008/0319751 A1 | 12/2008 | Kennewick | |
| 2009/0006077 A1 | 1/2009 | Keaveney | |
| 2009/0006194 A1 | 1/2009 | Sridharan | |
| 2009/0018829 A1 | 1/2009 | Kuperstein | |
| 2009/0024476 A1 | 1/2009 | Baar | |
| 2009/0030686 A1 | 1/2009 | Weng | |
| 2009/0052635 A1 | 2/2009 | Jones | |
| 2009/0055176 A1 | 2/2009 | Hu | |
| 2009/0067599 A1 | 3/2009 | Agarwal | |
| 2009/0076827 A1 | 3/2009 | Bulitta | |
| 2009/0106029 A1 | 4/2009 | DeLine | |
| 2009/0117885 A1 | 5/2009 | Roth | |
| 2009/0144131 A1 | 6/2009 | Chiu | |
| 2009/0144271 A1 | 6/2009 | Richardson | |
| 2009/0150156 A1 | 6/2009 | Kennewick | |
| 2009/0157382 A1 | 6/2009 | Bar | |
| 2009/0164216 A1 | 6/2009 | Chengalvarayan | |
| 2009/0171664 A1 | 7/2009 | Kennewick | |
| 2009/0171912 A1 | 7/2009 | Nash | |
| 2009/0197582 A1 | 8/2009 | Lewis | |
| 2009/0216540 A1 | 8/2009 | Tessel | |
| 2009/0248565 A1 | 10/2009 | Chuang | |
| 2009/0248605 A1 | 10/2009 | Mitchell | |
| 2009/0259561 A1 | 10/2009 | Boys | |
| 2009/0259646 A1 | 10/2009 | Fujita | |
| 2009/0265163 A1 | 10/2009 | Li | |
| 2009/0271194 A1 | 10/2009 | Davis | |
| 2009/0273563 A1 | 11/2009 | Pryor | |
| 2009/0276700 A1 | 11/2009 | Anderson | |
| 2009/0287680 A1 | 11/2009 | Paek | |
| 2009/0299745 A1 | 12/2009 | Kennewick | |
| 2009/0299857 A1 | 12/2009 | Brubaker | |
| 2009/0304161 A1 | 12/2009 | Pettyjohn | |
| 2009/0307031 A1 | 12/2009 | Winkler | |
| 2009/0313026 A1 | 12/2009 | Coffman | |
| 2009/0319517 A1 | 12/2009 | Guha | |
| 2010/0023320 A1 | 1/2010 | Cristo | |
| 2010/0023331 A1 | 1/2010 | Duta | |
| 2010/0029261 A1 | 2/2010 | Mikkelsen | |
| 2010/0036967 A1 | 2/2010 | Caine | |
| 2010/0049501 A1 | 2/2010 | Kennewick | |
| 2010/0049514 A1 | 2/2010 | Kennewick | |
| 2010/0057443 A1 | 3/2010 | Cristo | |
| 2010/0063880 A1 | 3/2010 | Atsmon | |
| 2010/0064025 A1 | 3/2010 | Nelimarkka | |
| 2010/0076778 A1 | 3/2010 | Kondrk | |
| 2010/0094707 A1 | 4/2010 | Freer | |

(56) References Cited

U.S. PATENT DOCUMENTS

| | | |
|---|---|---|
| 2010/0138300 A1 | 6/2010 | Wallis |
| 2010/0145700 A1 | 6/2010 | Kennewick |
| 2010/0185512 A1 | 7/2010 | Borger |
| 2010/0191856 A1 | 7/2010 | Gupta |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312547 A1 | 12/2010 | Van Os |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |
| 2014/0136187 A1 | 5/2014 | Wolverton |
| 2014/0136259 A1 | 5/2014 | Kinsey, II |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1 | 11/2014 | Bangalore |
| 2014/0337007 A1 | 11/2014 | Waibel |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1 | 7/2015 | Mirkin |
| 2015/0228276 A1 | 8/2015 | Baldwin |
| 2015/0293917 A1 | 10/2015 | Bute |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |
| 2017/0004588 A1 | 1/2017 | Isaacson |

FOREIGN PATENT DOCUMENTS

| | | |
|---|---|---|
| CN | 101236635 A | 8/2008 |
| CN | 103229206 A | 7/2013 |
| EP | 1320043 A2 | 6/2003 |
| EP | 1646037 | 4/2006 |
| FR | 2867583 | 9/2005 |
| JP | H08263258 | 10/1996 |
| JP | H11249773 | 9/1999 |
| JP | 2001071289 | 3/2001 |
| JP | 2002297626 | 10/2002 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 4/2000 |
| WO | 0046792 | 8/2000 |
| WO | 0129742 | 4/2001 |
| WO | 0129742 A2 | 4/2001 |
| WO | 0171609 A2 | 9/2001 |
| WO | 0178065 | 10/2001 |
| WO | 2004072954 | 8/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Processing of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Confer-

(56) References Cited

OTHER PUBLICATIONS ence on Human Language Technology Research, San Diego, 2001, pp. 1-5.
Chai et al., "MIND: A Semantics-Based Multimodal Interpretation Framework for Conversational System", Proceedings of the International CLASS Workshop on Natural, Intelligent and Effective Interaction in Multimodal Dialogue Systems, Jun. 2002, pp. 37-46.
Cheyer et al., "Multimodal Maps: An Agent-Based Approach", International Conference on Cooperative Multimodal Communication (CMC/95), May 24-26, 1995, pp. 111-121.
Davis, Z., et al., A Personal Handheld Multi-Modal Shopping Assistant, IEEE, 2006, 9 pages.
El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.
Elio et al., "On Abstract Task Models and Conversation Policies" in Workshop on Specifying and Implementing Conversation Policies, Autonomous Agents '99, Seattle, 1999, 10 pages.
Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.
Kuhn, Thomas, et al., "Hybrid In-Car Speech Recognition for Mobile Multimedia Applications", Vehicular Technology Conference, IEEE, Jul. 1999, pp. 2009-2013.
Lin, Bor-shen, et al., "A Distributed Architecture for Cooperative Spoken Dialogue Agents with Coherent Dialogue State and History", ASRU'99, 1999, 4 pages.
Lind, R., et al., "The Network Vehicle—A Glimpse into the Future of Mobile Multi-Media", IEEE Aerosp. Electron. Systems Magazine, vol. 14, No. 9, Sep. 1999, pp. 27-32.
Miao, Mark Z., "Automatic Training Set Segmentation for Multi-Pass Speech Recognition", Department of Electrical Engineering, Stanford University, CA, copyright 2005, IEEE, pp. I-685 to I-688.
O'Shaughnessy, Douglas, "Interacting with Computers by Voice: Automatic Speech Recognition and Synthesis", Proceedings of the IEEE, vol. 91, No. 9, Sep. 1, 2003, XP011100665, pp. 1272-1305.
Reuters, "IBM to Enable Honda Drivers to Talk to Cars", Charles Schwab & Co., Inc., Jul. 28, 2002, 1 page.
Turunen, "Adaptive Interaction Methods in Speech User Interfaces", Conference on Human Factors in Computing Systems, Seattle, Washington, 2001, pp. 91-92.
Vanhoucke, Vincent, "Confidence Scoring and Rejection Using Multi-Pass Speech Recognition", Nuance Communications, Menlo Park, CA, 2005, 4 pages.
Weng, Fuliang, et al., "Efficient Lattice Representation and Generation", Speech Technology and Research Laboratory, SRI International, Menlo Park, CA, 1998, 4 pages.
Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.
Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.
Zhao, Yilin, "Telematics: Safe and Fun Driving", IEEE Intelligent Systems, vol. 17, Issue 1, 2002, pp. 10-14.
Office Action issued in Chinese Patent Application No. 201580060519.1 dated Mar. 13, 2020, with its English translation, 40 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01346, Decision Granting Institution of Inter Partes Review of U.S. Pat. No. 9,015,049 B2, entered Feb. 4, 2021, 24 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01367, Decision Granting Institution of Inter Partes Review of U.S. Pat. No. 8,073,681 B2, entered Mar. 11, 2021, 22 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01374, Decision Denying Institution of Inter Partes Review of U.S. Pat. No. 8,886,536 B2, entered Feb. 4, 2021, 37 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01377, Decision Denying Institution of Inter Partes Review of U.S. Pat. No. 8,886,536 B2, entered Feb. 4, 2021, 29 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01380, Decision Denying Institution of Inter Partes Review of U.S. Pat. No. 9,626,703 B2, entered Feb. 4, 2021, 28 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01381, Decision Denying Institution of Inter Partes Review of U.S. Pat. No. 9,626,703 B2, entered Feb. 4, 2021, 29 pages.
*Amazon.vom, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01388, Decision Denying Institution of Inter Partes Review of U.S. Pat. No. 9,269,097 B2, entered Feb. 24, 2021, 25 pages.
*Amazon.com, Inc., Amazon.com LLC, Amazon Web Services, Inc., A2Z Development Center, Inc. d/b/a/ Lab126, Rawles LLC, Amzn Mobile LLC, Amzn Mobile 2 LLC, Amazon.com Services, Inc. f/k/a Amazon Fulfillment Services, Inc., and Amazon.com Services LLC (formerly Amazon Digital Services LLC) v. VB Assets, LLC,* IPR2020-01390, Decision Denying Institution of Inter Partes Review of U.S. Pat. No. 7,818,176, entered Mar. 11, 2021, 27 pages.
Asthana, A., et al., "A Small Domain Communications System for Personalized Shopping Assistance", Proceedings of 1994 International Conference on Personal Wireless Communications, IEEE Press, Aug. 1994, pp. 199-203.
Huang et al., "Spoken Language Processing: A Guide to Theory, Algorithm, and System Development", Prentice Hall, 2001, 1010 pages.
IEEE 100 The Authoritative Dictionary of IEEE Standards Terms, Seventh Edition, Standards Information Network, IEEE Press, Print ISBN 0-7381-2601-2, Published Dec. 2000, 3 pages.
Lucente, Mark, "Conversational Interfaces for E-Commerce Applications", Communications of the ACM, vol. 43, No. 9, Sep. 2000, pp. 59-61.
Seneff, Stephanie, et al., "Hypothesis Selection and Resolution in the Mercury Flight Reservation System", Spoken Language Systems Group, MIT, 2001, 8 pages.

\* cited by examiner

SYSTEM AND METHOD FOR A COOPERATIVE CONVERSATIONAL VOICE USER INTERFACE

CROSS-REFERENCE TO RELATED APPLICATIONS

This application is a divisional of U.S. patent application Ser. No. 14/691,445, entitled "SYSTEM AND METHOD FOR A COOPERATIVE CONVERSATIONAL VOICE USER INTERFACE," filed Apr. 20, 2015, which is a continuation of U.S. patent application Ser. No. 13/987,645, entitled "SYSTEM AND METHOD FOR A COOPERATIVE CONVERSATIONAL VOICE USER INTERFACE," filed Aug. 19, 2013 (which issued as U.S. Pat. No. 9,015,049 on Apr. 21, 2015), which is a divisional of U.S. patent application Ser. No. 13/251,712, entitled "SYSTEM AND METHOD FOR A COOPERATIVE CONVERSATIONAL VOICE USER INTERFACE," filed Oct. 3, 2011 (which issued as U.S. Pat. No. 8,515,765 on Aug. 20, 2013), which is a continuation of U.S. patent application Ser. No. 11/580,926, entitled "SYSTEM AND METHOD FOR A COOPERATIVE CONVERSATIONAL VOICE USER INTERFACE," filed Oct. 16, 2006 (which issued as U.S. Pat. No. 8,073,681 on Dec. 6, 2011), each of which are hereby incorporated by reference in its entirety.

FIELD OF THE INVENTION

The invention relates to a cooperative conversational model for a human to machine voice user interface.

BACKGROUND OF THE INVENTION

Advances in technology, particularly within the convergence space, have resulted in an increase in demand for voice recognition software that can exploit technology in ways that are intuitive to humans. While communication between human beings is most often "cooperative," in that information and/or context is shared to advance mutual conversational goals, existing Human-to-Machine interfaces fail to provide the same level of intuitive interaction. For example, each human participant in a conversation can contribute to an exchange for the benefit of the exchange. This is done through shared assumptions and expectations regarding various aspects of the conversation, such as the topic, participant knowledge about the topic, expectations of the other participant's knowledge about the topic, appropriate word usage for the topic and/or participants, conversational development based on previous utterances, the participants' tone or inflection, the quality and quantity of contribution expected from each participant, and many other factors. Participating in conversations that continually build and draw upon shared information is a natural and intuitive way for humans to converse.

In contrast, complex Human-to-Machine interfaces do not allow users to exploit technology in an intuitive way, which inhibits mass-market adoption for various technologies. Incorporating a speech interface helps to alleviate this burden by making interaction easier and faster, but existing speech interfaces (when they actually work) still require significant learning on the part of the user. That is, existing speech interfaces are unable to bridge the gap between archaic Human-to-Machine interfaces and conversational speech that would make interaction with systems feel normal. Users should be able to directly request what they want from a system in a normal, conversational fashion, without having to memorize exact words or phrases. Alternatively, when users are uncertain of particular needs, they should be able to engage the system in a productive, cooperative dialogue to resolve their requests. Instead, existing speech interfaces force users to dumb down their requests to match simple sets of instructions in simple languages in order to communicate requests in ways that systems can understand. Using existing speech interfaces, there is virtually no option for dialogue between the user and the system to satisfy mutual goals.

Therefore, existing systems lack a conversational speech model that can provide users with the ability to interact with systems in ways that are inherently intuitive to human beings. Existing systems suffer from these and other problems.

SUMMARY OF THE INVENTION

According to various embodiments and aspects of the invention, a cooperative conversational voice user interface may understand free form human utterances, freeing users from being restricted to a fixed set of commands and/or requests. Rather, users can engage in cooperative conversations with a machine to complete a request or series of requests using a natural, intuitive, free form manner of expression.

According to an aspect of the invention, an exemplary system architecture for implementing a cooperative conversational voice user interface is provided. The system may receive an input, which may include a human utterance received by an input device, where the utterance may include one or more requests. As used herein, an "utterance" may be words, syllables, phonemes, or any other audible sound made by a human being. As used herein, a "request" may be a command, directive, or other instruction for a device, computer, or other machine to retrieve information, perform a task, or take some other action. In one implementation, the input may be a multi-modal input, where at least part of the multi-modal input is an utterance. The utterance component of the input may be processed by a speech recognition engine (which may alternatively be referred to as an Automatic Speech Recognizer or ASR) to generate one or more preliminary interpretations of the utterance. The one or more preliminary interpretations may then be provided to a conversational speech engine for further processing, where the conversational speech engine may communicate with one or more databases to generate an adaptive conversational response, which may be returned to the user as an output. In one implementation, the output may be a multi-modal output. For example, the utterance may include a request to perform an action, and the output may include a conversational response reporting success or failure, as well as an execution of the action.

According to another aspect of the invention, an exemplary conversational speech engine may generate an adaptive conversational response to a request or series of requests. The conversational speech engine may include a free form voice search module that may understand an utterance made using typical, day-to-day language (i.e., in free form), and may account for variations in how humans normally speak, the vocabulary they use, and the conditions in which they speak. To account for intangible variables of human speech, the free form search module may include models of casual human speech. For example, in one implementation, the free form search module may understand specialized jargon and/or slang, tolerate variations in word order, and tolerate verbalized pauses or stuttered speech. For example, formalized English requests, where a verb precedes a noun, may be treated in an equivalent manner to requests where the noun precedes the verb. In another implementation, compound requests and/or compound tasks with multiple variables may be identified in a single utterance. By identifying all relevant information for completing one or more tasks from a single utterance, advantages may be provided over existing voice user interfaces, such as Command and Control systems that use verbal menus to restrict information that a person can provide at a given point. In another implementation, inferring intended requests from incomplete or ambiguous requests may provide a conversational feel. By modeling what contextual signifiers, qualifiers, or other information may be required to perform a task in an identified context, an adaptive response may be generated, such as prompting a user for missing contextual signifiers, qualifiers, or other information. In one implementation, the response may ask for missing information in a way that most restricts possible interpretations, and the response may be framed to establish a domain for a subsequent user utterance. In another implementation, common alternatives for nouns and verbs may be recognized to reflect variations in usage patterns according to various criteria. Thus, variations in expression may be supported because word order is unimportant or unanticipated, and nouns and/or verbs may be represented in different ways to give simplistic, yet representative, examples. In another implementation, requests may be inferred from contradictory or otherwise inaccurate information, such as when an utterance includes starts and stops, restarts, stutters, run-on sentences, or other imperfect speech. For example, a user may sometimes change their mind, and thus alter the request in mid-utterance, and the imperfect speech feature may nonetheless be able to infer a request based on models of human speech. For example, various models may indicate that a last criterion is most likely to be correct, or intonation, emphasis, stress, use of the word "not," or other models may indicate which criterion is most likely to be correct.

According to another aspect of the invention, the conversational speech engine may include a noise tolerance module that may discard words or noise which has no meaning in a given context to reduce a likelihood of confusion. Moreover, the noise tolerance module may filter out environmental and non-human noise to further reduce a likelihood of confusion. In one implementation, the noise tolerance module may cooperate with other modules and features to filter out words that do not fit into an identified context. For example, the noise tolerance module may filter other human conversations and/or utterances within a range of one or more microphones. For example, a single device may include multiple microphones, or multiple devices may each include one or more microphones, and the noise tolerance module may collate inputs and cooperatively filter out sound by comparing a speech signal from the various microphones. The noise tolerance module may also filter out non-human environmental noise within range of the microphones, out-of-vocabulary words caused by speaker ambiguity or malapropisms, or other noise that may be unrelated to a target request. Performance benchmarks for the noise tolerance module may be defined by noise models based on human criteria. For example, if a driver of a car is 92% likely to be understood by a passenger when traveling at 65 miles-per-hour with windows cracked, then performance benchmarks for the noise tolerance module may have a similar performance under such conditions.

According to another aspect of the invention, the conversational speech engine may include a context determination process that determines one or more contexts for a request to establish meaning within a conversation. The one or more contexts may be determined by having one or more context domain agents compete to determine a most appropriate domain for a given utterance. Once a given domain agent "wins" the competition, the winning domain agent may be responsible for establishing or inferring further contexts and updating short-term and long-term shared knowledge. If there is a deadlock between context domain agents, an adaptive conversational response may prompt the user to assist in disambiguating between the deadlocked agents. Moreover, the context determination process may infer intended operations and/or context based on previous utterances and/or requests, whereas existing systems consider each utterance independently, potentially making the same errors over and over again. For example, if a given interpretation turns out to be incorrect, the incorrect interpretation may be removed as a potential interpretation from one or more grammars associated with the speech recognition engine and/or from possible interpretations determined by the conversational speech engine, thereby assuring that a mistake will not be repeated for an identical utterance.

The context determination process may provide advantages over existing voice user interfaces by continually updating one or more models of an existing context and establishing context as a by-product of a conversation, which cannot be established a priori. Rather, the context determination process may track conversation topics and attempt to fit a current utterance into recent contexts, including switching between contexts as tasks are completed, partially completed, requested, etc. The context determination process may identify one or more context domains for an utterance by defining a collection of related functions that may be useful for users in various context domains. Moreover, each context domain may have relevant vocabularies and thought collections to model word groupings, which when evaluated together, may disambiguate one context domain from another. Thus, eliminating out-of-context words and noise words when searching for relevant combinations may enhance accuracy of inferences. This provides advantages over existing systems that attempt to assign meaning to every component of an utterance (i.e., including out-of-context words and noise words), which results in nearly infinite possible combinations and greater likelihood of confusion. The context determination process may also be self-aware, assigning degrees of certainty to one or more generated hypotheses, where a hypothesis may be developed to account for variations in environmental conditions, speaker ambiguity, accents, or other factors. By identifying a context, capabilities within the context, vocabularies within the context, what tasks are done most often historically in the context, what task was just completed, etc., the context determination process may establish intent from rather meager phonetic clues. Moreover, just as in human-to-human conversation, users may switch contexts at any time without confusion, enabling various context domains to be rapidly selected, without menu-driven dead ends, when an utterance is unambiguous.

According to another aspect of the invention, an exemplary cooperative conversational model may build upon free form voice search, noise tolerance, and context determination to implement a conversational Human-to-Machine interface that reflects human interaction and normal conversational behavior. That is, the cooperative conversational model enables humans and machines to participant in a conversation with an accepted purpose or direction, with each participant contributing to the conversation for the benefit of the conversation. By taking advantage of human presumptions about utterances that humans rely upon, both as speakers and listeners, a Human-to-Machine interface may be analogous to everyday human-to-human conversation. In one implementation, the exemplary cooperative conversation model may take incoming data (shared knowledge) to inform a decision (intelligent hypothesis building), and then may refine the decision and generate a response (adaptive response building).

According to another aspect of the invention, shared knowledge may include both short-term and long-term knowledge. Short-term knowledge may accumulate during a single conversation, where input received during a single conversation may be retained. The shared knowledge may include cross-modality awareness, where in addition to accumulating input relating to user utterances, requests, locations, etc., the shared knowledge may accumulate a current user interface state relating to other modal inputs to further build shared knowledge models. The shared knowledge may be used to build one or more intelligent hypotheses using current and relevant information, build long-term shared knowledge by identifying information with long-term significance, and generate adaptive responses with relevant state and word usage information. Moreover, because cooperative conversations model human conversations, short-term session data may be expired after a psychologically appropriate amount of time, thereby humanizing system behavior, reducing a likelihood of contextual confusion based on stale data, while also adding relevant information from an expired session context to long-term knowledge models. Long-term shared knowledge may generally be user-centric, rather than session-based, where inputs may be accumulated over time to build user, environmental, cognitive, historical, or other long-term knowledge models. Long-term and short-term shared knowledge may be used simultaneously anytime a user engages in a cooperative conversation. Long-term shared knowledge may include explicit and/or implicit user preferences, a history of recent contexts, requests, tasks, etc., user-specific jargon related to vocabularies and/or capabilities of a context, most often used word choices, or other information. The long-term shared knowledge may be used to build one or more intelligent hypotheses using current and relevant information, generate adaptive responses with appropriate word choices when unavailable via short-term shared knowledge, refine long-term shared knowledge models, identify a frequency of specific tasks, identify tasks a user frequently has difficulty with, or provide other information and/or analysis to generate more accurate conversational responses. Shared knowledge may also be used to adapt a level of unprompted support (e.g., for novices versus experienced users, users who are frequently misrecognized, etc.) Thus, shared knowledge may enable a user and a voice user interface to share assumptions and expectations such as topic knowledge, conversation history, word usage, jargon, tone, or other assumptions and/or expectations that facilitate a cooperative conversation between human users and a system.

According to another aspect of the invention, a conversation type may be identified for any given utterance. Categorizing and developing conceptual models for various types of exchanges may consistently align user expectations and domain capabilities. One or more intelligent hypotheses may be generated as to a conversation type by considering conversational goals, participant roles, and/or an allocation of information among the participants. Based on the conversational goals, participant roles, and allocation of information, the intelligent hypotheses may consider various factors to classify a conversation (or utterance) into general types of conversations that can interact with one another to form many more variations and permutations of conversation types (e.g., a conversation type may change dynamically as information is reallocated from one participant to another, or as conversational goals change based on the reallocation of information).

According to another aspect of the invention, the intelligent hypotheses may include one or more hypotheses of a user's intent in an utterance. In addition, the intelligent hypotheses may use short-term and/or long-term shared knowledge to proactively build and evaluate interaction with a user as a conversation progresses or over time. The hypotheses may model human-to-human interaction to include a varying degree of certainty for each hypothesis. That is, just as humans rely on knowledge shared by participants to examine how much and what kind of information was available, the intelligent hypotheses may leverage the identified conversation type and shared knowledge to generate a degree of certainty for each hypothesis.

According to another aspect of the invention, syntactically, grammatically, and contextually sensitive "intelligent responses" may be generated from the intelligent hypotheses that can be used to generate a conversational experience for a user, while also guiding the user to reply in a manner favorable for recognition. The intelligent responses may create a conversational feel by adapting to a user's manner of speaking, framing responses appropriately, and having natural variation and/or personality (e.g., by varying tone, pace, timing, inflection, word use, jargon, and other variables in a verbal or audible response).

According to another aspect of the invention, the intelligent responses may adapt to a user's manner of speaking by using contextual signifiers and grammatical rules to generate one or more sentences that may cooperate with the user. By taking advantage of shared knowledge about how a user utters a request, the responses may be modeled using similar techniques used to recognize requests. The intelligent responses may rate possible responses statistically and/or randomize responses, which creates an opportunity to build an exchange with natural variation and conversational feel. This provides advantages over existing voice user interfaces where input and output is incongruous, as the input is "conversational" and the output is "computerese."

According to another aspect of the invention, the intelligent responses may frame responses to influence a user reply utterance for easy recognition. For example, the responses may be modeled to illicit utterances from the user that may be more likely to result in a completed request. Thus, the responses may conform to a cooperative nature of human dialog and a natural human tendency to "parrot" what was just heard as part of a next utterance. Moreover, knowledge of current context may enhance responses to generate more meaningful conversational responses. Framing the responses may also deal with misrecognitions according to human models. For example, humans frequently remember a number of recent utterances, especially when one or more previous utterances were misrecognized or unrecognized. Another participant in the conversation may limit correction to a part of the utterance that was misrecognized or unrecognized, or over subsequent utterances and/or other interactions, clues may be provided to indicate the initial interpretation was incorrect. Thus, by storing and analyzing multiple utterances, utterances from earlier in a conversation may be corrected as the conversation progresses.

According to another aspect of the invention, the intelligent responses may include multi-modal, or cross-modal, responses to a user. In one implementation, responses may be aware of and control one or more devices and/or interfaces, and users may respond by using whichever input method, or combination of input methods, is most convenient.

According to another aspect of the invention, the intelligent responses may correct a course of a conversation without interrupting conversational flow. That is, even though the intelligent responses may be reasonably "sure," the intelligent responses may nonetheless sometimes be incorrect. While existing voice user interfaces tend to fail on average conversational missteps, normal human interactions may expect missteps and deal with them appropriately. Thus, responses after misrecognitions may be modeled after clarifications, rather than errors, and words may be chosen in subsequent responses to move conversation forward and establish an appropriate domain to be explored with the user.

Other objects and advantages of the invention will be apparent to those skilled in the art based on the following drawings and detailed description.

DETAILED DESCRIPTION

Figure 1:
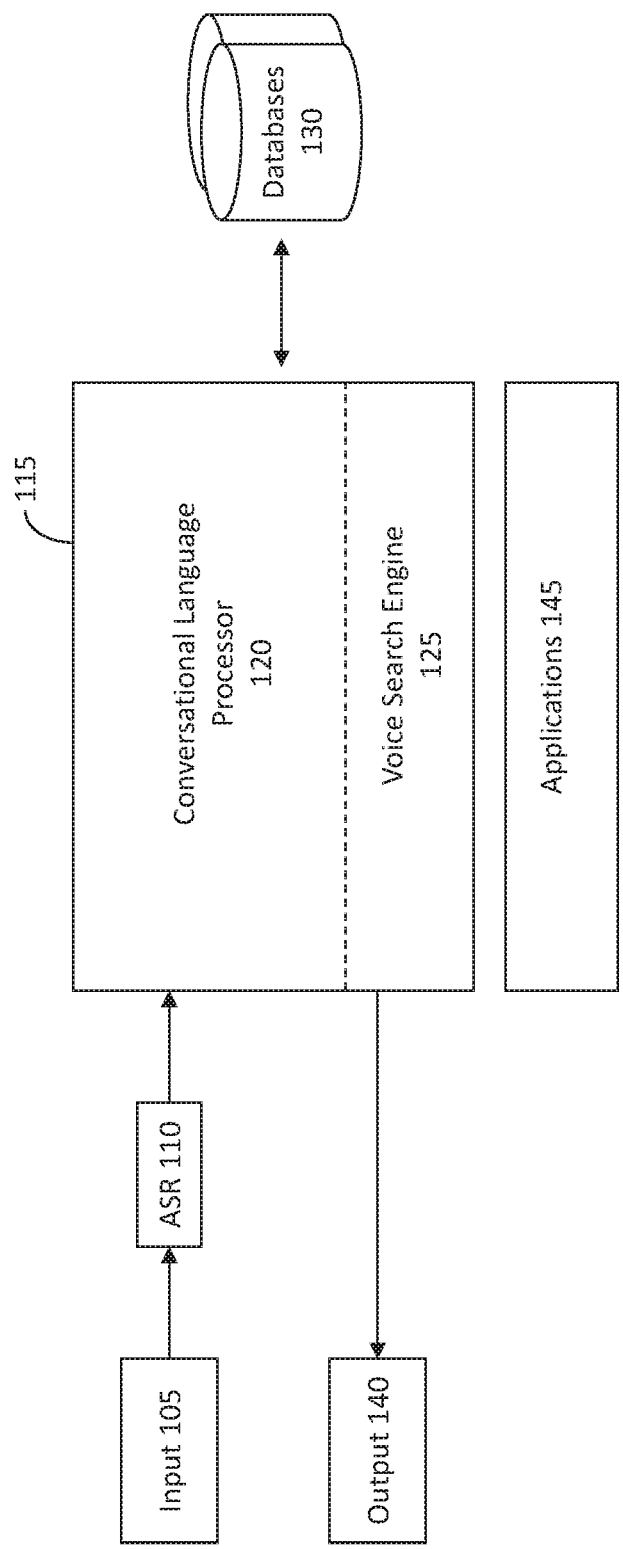
FIG. 1 is an exemplary block diagram of a system architecture according to one aspect of the invention.

Referring to FIG. 1, an exemplary system architecture for implementing a cooperative conversational voice user interface is illustrated according to one aspect of the invention. The system may receive an input 105 from a user, where in one implementation, input 105 may be an utterance received by an input device (e.g., a microphone), where the utterance may include one or more requests. Input 105 may also be a multi-modal input, where at least part of the multi-modal input is an utterance. For example, the input device may include a combination of a microphone and a touch-screen device, and input 105 may include an utterance that includes a request relating to a portion of a display on the touch-screen device that the user is touching. For instance, the touch-screen device may be a navigation device, and input 105 may include an utterance of "Give me directions to here," where the user may be requesting directions to a desired destination on the display of the navigation device.

The utterance component of input 105 may be processed by a speech recognition engine 110 (which may alternatively be referred to herein as Automatic Speech Recognizer 110, or as shown in FIG. 1, ASR 110) to generate one or more preliminary interpretations of the utterance. The speech recognition engine 110 may process the utterance using any suitable technique known in the art. For example, in one implementation, the speech recognition engine 110 may interpret the utterance using techniques of phonetic dictation to recognize a phoneme stream, as described in U.S. patent application Ser. No. 11/513,269, entitled "Dynamic Speech Sharpening," filed Aug. 31, 2006, which issued as U.S. Pat. No. 7,634,409 on Dec. 15, 2009, and which is hereby incorporated by reference in its entirety. The one or more preliminary interpretations generated by the speech recognition engine 110 may then be provided to a conversational speech engine 115 for further processing. Conversational speech engine 115 may include a conversational language processor 120 and/or a voice search engine 125, described in greater detail in FIG. 2 below. Conversational speech engine 115 may communicate with one or more databases 130 to generate an adaptive conversational response, which may be returned to the user as an output 140. In one implementation, output 140 may be a multi-modal output and/or an interaction with one or more applications 145 to complete the request. For example, output 140 may include a combination of an audible response and a display of a route on a navigation device. For example, the utterance may include a request to perform an action, and output 140 may include a conversational response reporting success or failure, as well as an execution of the action. In addition, in various implementations, the speech recognition engine 110, conversational speech engine 115, and/or databases 130 may reside locally (e.g., on a user device), remotely (e.g., on a server), or a hybrid model of local and remote processing may be used (e.g., lightweight applications may be processed locally while computationally intensive applications may be processed remotely).

Figure 2:
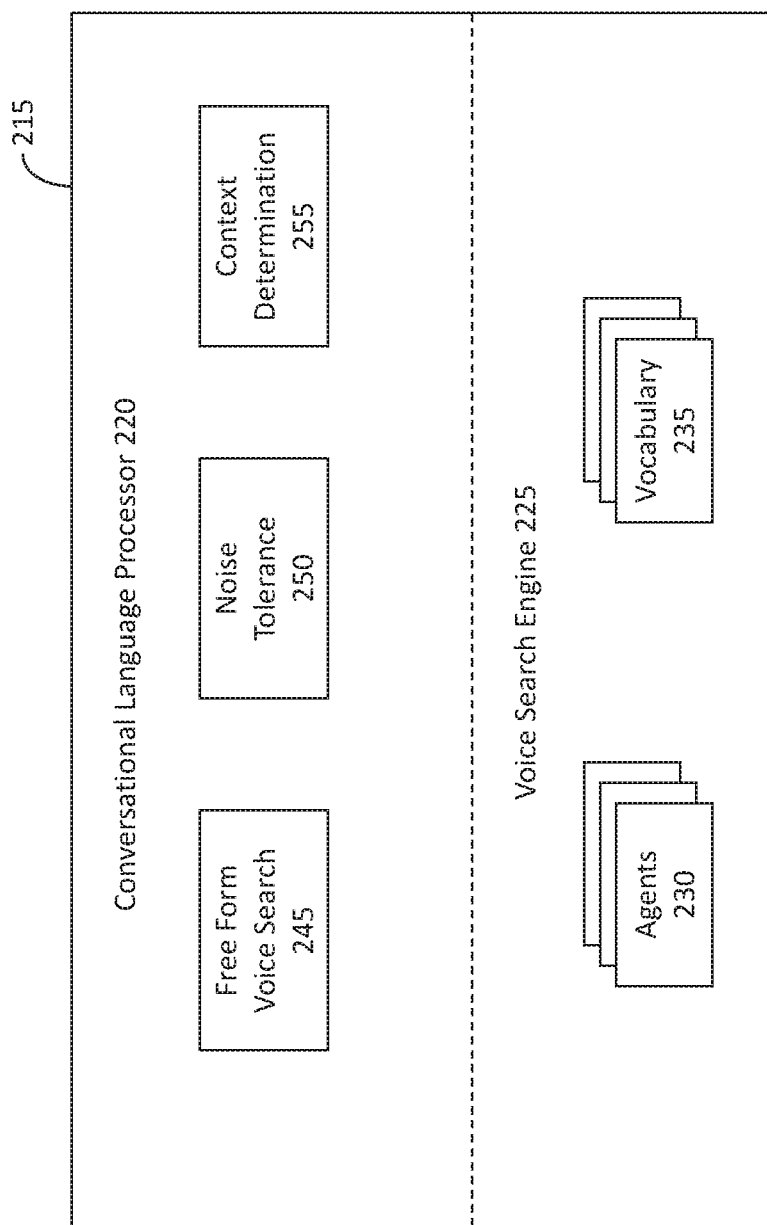
FIG. 2 is an exemplary block diagram of a conversational speech engine according to one aspect of the invention.

Referring to FIG. 2, an exemplary block diagram is provided illustrating a conversational speech engine 215 according to one aspect of the invention. Conversational speech engine 215 may include a conversational language processor 220 that generates an adaptive conversational response to a request or series of requests using a free form voice search module 245, a noise tolerance module 250, and/or a context determination process 255. According to one aspect of the invention, modules 245-255 may communicate with a voice search engine 225 that includes one or more context domain agents 230 and/or one or more vocabularies 235 to aid in interpreting utterances and generating responses, as described in "Enhancing the VUE™ (Voce-User-Experience) Through Conversational Speech," by Tom Freeman and Larry Baldwin, which is herein incorporated by reference in its entirety. Conversational speech engine 215 may generate an adaptive conversational response to one or more requests, where the requests may depend on unspoken assumptions, incomplete information, context established by previous utterances, user profiles, historical profiles, environmental profiles, or other information. Moreover, conversational speech engine 215 may track which requests have been completed, which requests are being processed, and/or which requests cannot be processed due to incomplete or inaccurate information, and the response may be generated accordingly.

According to one aspect of the invention, free form voice search module 245 may understand an utterance made using typical, day-to-day language (i.e., in free form), and may account for variations in how humans normally speak, the vocabulary they use, and the conditions in which they speak. Because variables such as stress, distraction, and serendipity are always different and infinitely varied, free form search module 245 may be designed with a goal of understanding that no human will come to the same Human-to-Machine interface situation in the same way twice. Thus, free form search module 245 may implement one or more features that model casual human speech. In various implementations, free form search module 245 may include, among other things, a free form utterance feature, a one-step access feature, an inferencing intended operations feature, an alternative expression feature, and/or an imperfect speech feature.

The free form utterance feature may understand specialized jargon and/or slang, tolerate variations in word order (e.g., whether a subject of a request comes before or after a verb may be irrelevant), and tolerate verbalized pauses (e.g., "um," "ah," "eh," and other utterances without meaning). For example, the free form utterance feature may treat formalized English verb-before-noun requests in an equivalent manner to free form requests where a noun may precede a verb. For example, user utterances of "Change it to the Squizz" and "You know, um, that Squizz channel, ah, switch it there" may be treated equivalently (where Squizz is a channel on XM Satellite Radio). In either case, the free form utterance feature is able to identify "Squizz" as a subject of the utterance and "Change it" or "switch it" as a verb or request for the utterance (e.g., by cooperating with context determination process 255, or other features, and identifying a relevant context domain agent 230 and/or vocabulary 235 to interpret the utterance).

The one-step access feature may understand utterances that include compound requests with multiple variables. For example, a user utterance may be "What is the forecast for Boston this weekend?" The one-step access feature may identify "weather" as a context (e.g., by cooperating with context determination process 255, or other features, and identifying "forecast" as a synonym of "weather"), and search for a city equal to "Boston" and a time equal to "weekend." By identifying all relevant information for completing a task from a single utterance, the one-step access feature may overcome drawbacks of existing voice user interfaces, such as Command and Control systems that use verbal menus to restrict information that a person can provide at a given point (e.g., a Command and Control system for a phone directory service may say: "State please," . . . "City please," . . . "What listing," etc.). Moreover, some utterances may include compound requests, and the one-step access feature may decompose the compound requests into sub-tasks. For example, a user utterance of "I need to be at a meeting tomorrow in San Francisco at 8:00 am" may be decomposed into a set of sub-tasks such as (1) checking availability and reserving a flight on an evening before the meeting, (2) checking availability and reserving a hotel, (3) checking availability and reserving a car, etc., where users may further designate preferences for various tasks (e.g., first check availability on an airline for which the user is a frequent flyer). Depending on a level of shared knowledge about a user's preferences and/or historical patterns, the one-step access feature may infer additional tasks from a request. For example, in the above example, the one-step access feature may also check a weather forecast, and if the weather is "nice" (as defined by the user preferences and/or as inferred from historical patterns), the one-step access feature may schedule a tee-time at a preferred golf course in San Francisco.

The inferencing intended operations feature may identify an intended request from incomplete or ambiguous requests. For example, when a user utters "Route <indecipherable> Chicago <indecipherable> here," where the user intended to say "Route calculation to Chicago from here," the inferencing intended operations feature may model what is required to calculate a route (an origination point and a destination point). Because the utterance includes the origination point and the destination point, a request to calculate a route from the user's present location to Chicago may be inferred. Similarly, when the inferencing intended operations feature does not have sufficient information to infer a complete request, an adaptive conversational response may be generated to prompt the user for missing information. For example, when an utterance includes a request for a stock quote but not a company name (e.g., "Get me the stock price for <indecipherable>"), the response may be "What company's stock quote do you want?" The user may then provide an utterance including the company name, and the request may be completed. In one implementation, the response may ask for missing information in a way that most restricts possible interpretations (e.g., in a request for a task that requires both a city and a state, the state may be asked for first because there are fewer states than cities). Moreover, the inferencing intended operations feature may model compound tasks and/or requests by maintaining context and identifying relevant and/or missing information at both a composite and sub-task level.

The alternative expression feature may recognize common alternatives for nouns and verbs to reflect variations in usage patterns according to various criteria. For example, users may vary expression based on age, socio-economics, ethnicity, user whims, or other factors. Thus, the alternative expression feature may support variations in expression where word order is unimportant or unanticipated. Alternatives in expression based on various criteria or demographics may be loaded into context domain agents 230 and/or vocabularies 235, and the alternative expression feature may update context domain agents 230 and/or vocabularies 235 based on inferred or newly discovered variations. In one implementation, conversational speech engine 215 may include a subscription interface to update changes to context domain agents 230 and/or vocabularies 235 (e.g., a repository may aggregate various user utterances and deploy updates system wide). In operation, the alternative expression feature may allow nouns and/or verbs to be represented in different ways to give simplistic, yet representative, examples. For example, a user interested in a weather forecast for Washington, D.C. may provide any of the following utterances, each of which are interpreted equivalently: "What's the weather like in DC," "Is it raining inside the Beltway," Gimme the forecast for the capital," etc. Similarly, utterances of "Go to my home," "Go home," "Show route to home," and "I would like to know my way home" may all be interpreted equivalently, where a user profile may include the user's home address and a navigation route to the home address may be calculated.

The imperfect speech feature may be able to infer requests from contradictory or otherwise inaccurate information, such as when an utterance includes starts and stops, restarts, stutters, run-on sentences, or other imperfect speech. For example, a user may sometimes change their mind, and thus alter the request in mid-utterance, and the imperfect speech feature may nonetheless be able to infer a request based on models of human speech. For example, for an utterance of "Well, I wanna . . . Mexi . . . no, steak restaurant please, I'm hungry," existing voice user interfaces make no assumptions regarding models of human speech and would be unable to infer whether the user wanted a Mexican or steak restaurant. The imperfect speech feature overcomes these drawbacks by using various models of human understanding that may indicate that a last criterion is most likely to be correct, or intonation, emphasis, stress, use of the word "not," or other models may indicate which criterion is most likely to be correct. Thus, in the above example, the imperfect speech feature may infer that the user wants a steak restaurant.

According to one aspect of the invention, noise tolerance module 250 may be closely related to the imperfect speech feature, and may operate to discard words or noise that has no meaning in a given context so as not to create confusion. Moreover, noise tolerance module 250 may filter out environmental and non-human noise to further reduce a likelihood of confusion. In one implementation, noise tolerance module 250 may cooperate with other modules and features to filter out words that do not fit into a context. For example, one or more contexts may be identified, and words that have no meaning with respect to system capabilities, random human utterances without meaning and other noise may be filtered out. Thus, noise tolerance module 250 may model real-world conditions to identify meaningful requests. For example, noise tolerance module 250 may filter other human conversations and/or utterances within a range of one or more microphones, For example, a single device may include multiple microphones, or multiple devices may each include one or more microphones, and the noise tolerance module may collate inputs and cooperatively filter out sound by comparing a speech signal from the various microphones. Noise tolerance module 250 may also filter out non-human environmental noise within the range of the microphones, out-of-vocabulary words, which could be a result of speaker ambiguity or malapropisms, or other noise that may be unrelated to a target request. Noise models in noise tolerance module 250 may define performance benchmarks based on human criteria. For example, if a driver of a car, traveling at 65 miles-per-hour, with windows cracked is 92% likely to be understood by a passenger, then noise tolerance module 250 may have a similar performance under those conditions.

According to one aspect of the invention, conversational speech engine 215 may include a context determination process 255 that determines one or more contexts for a request to establish meaning within a conversation. The one or more contexts may be determined by having one or more context domain agents compete to determine a most appropriate domain for a given utterance, as described in U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009 and U.S. patent application Ser. No. 11/212,693, entitled "Mobile Systems and Methods of Supporting Natural Language Human-Machine Interactions," filed Aug. 29, 2005, which issued as U.S. Pat. No. 7,949,529 on May 24, 2011, both of which are hereby incorporated by reference in their entirety. Once a given context domain agent "wins" the competition, the winning agent may be responsible for establishing or inferring further contexts and updating short-term and long-term shared knowledge. If there is a deadlock between context domain agents, an adaptive conversational response may prompt the user to assist in disambiguating between the deadlocked agents. For example, a user utterance of "What about traffic?" may have a distinct meaning in various contexts. That is, "traffic" may have a first meaning when the user is querying a system's media player (i.e., "traffic" would be a Rock and Roll band led by singer/songwriter Steve Winwood), a second meaning when the user is querying a search interface regarding Michael Douglas films (i.e., "traffic" would be a film directed by Steven Soderbergh), a third meaning when the user is querying a navigation device for directions to an airport (i.e., "traffic" would be related to conditions on roads along a route to the airport).

Moreover, context determination process 255 may infer intended operations and/or context based on previous utterances and/or requests, whereas existing systems consider each utterance independently, potentially making the same errors over and over again. For example, if a given interpretation turns out to be incorrect, the incorrect interpretation may be removed as a potential interpretation from one or more grammars associated with the speech recognition engine and/or from possible subsequent interpretations determined by context determination process 255, thereby assuring that a mistake will not be repeated for an identical utterance.

Context determination process 255 may overcome drawbacks of existing systems by continually updating one or more models of an existing context, where establishing context may be a by-product of a conversation, which cannot be established a priori. Context determination process 255 may establish a first context domain, change to a second context domain, change back to the first context domain, and so on, as tasks are completed, partially completed, requested, etc., and a context stack may track conversation topics and attempt to fit a current utterance into a most-recent context, next-most-recent topic, etc., traversing the context stack until a most likely intent can be established. For example, a user may utter "What's the traffic report," and context determination process 255 may establish Traffic as a context, and return an output including a traffic report, which does not happen to mention traffic on Interstate-5. The user may then utter "What about I-5?" and context determination process 255 may know that the current context is Traffic, a traffic report including information about Interstate-5 may be searched for, and the traffic report indicating that Interstate-5 is crowded may be returned as an output. The user may then utter "Is there a faster way?" and context determination module 255 may know that the current context is still Traffic, and may search for routes to a specified destination with light traffic and avoiding Interstate-5. Moreover, context determination process 255 may build context based on user profiles, environmental profiles, historical profiles, or other information to further refine the context. For example, the profiles may indicate that Interstate-5 is a typical route taken Monday through Friday.

The profiles may be particularly meaningful when attempting to disambiguate between contexts where a word has different meanings in different contexts. For example, a user may utter "What's the weather in Seattle?" and context determination process 255 may establish Weather as a context, as well as establishing Seattle as an environmental context. The user may then utter "and Portland?" and context determination process 255 may return a weather report for Portland, Oreg. based on the Weather and an environmental proximity between Portland, Oreg. and Seattle, Wash. The user may then ask "What time does the game start?" and a search for sports events with teams from Seattle and/or Portland may occur, with results presented conversationally according to methods described in greater detail below in FIG. 3. Correlatively, had user originally uttered "What's the weather in Portsmouth, N.H.," in the second utterance, context determination process 255 may instead retrieve a weather report for Portland, Me. based on an environmental proximity to New Hampshire. Moreover, when environmental profiles, contextual shared knowledge, and/or other short-term and/or long-term shared knowledge does not provide enough information to disambiguate between possibilities, responses may prompt the user with a request for further information (e.g., "Did you mean Portland, Me., or Portland, Oreg.?").

Context determination process 255 may cooperate with context domain agents 230, where each context domain agent 230 may define a collection of related functions that may be useful for users. Moreover, each context domain agent 230 may include a relevant vocabulary 235 and thought collections that model word groupings, which when evaluated together, may disambiguate one context domain from another (e.g., a Music context domain agent 230 may include a vocabulary 235 for songs, artists, albums, etc., whereas a Stock context domain agent 230 may include a vocabulary 235 for company names, ticker symbols, financial metrics, etc.). Thus, accuracy in identifying meaning may be enhanced by eliminating out-of-context words and noise words when searching for relevant combinations. In contrast, existing systems attempt to assign meaning to every component of an utterance (e.g., including out-of-context words and noise words), which results in nearly infinite possible combinations and greater likelihood of confusion. Moreover, context domain agents 230 may include metadata for each criteria to further assist in interpreting utterances, inferring intent, completing incomplete requests, etc. (e.g., a Space Needle vocabulary word may include metadata for Seattle, landmark, tourism, Sky City restaurant, etc.). Given a disambiguated criterion, context determination process 255 may thus be able to automatically determine other information needed to complete a request, discard importance of word order, and perform other enhancements for conversational speech.

Context domain agents 230 may also be self-aware, assigning degrees of certainty to one or more generated hypotheses, where a hypothesis may be developed to account for variations in environmental conditions, speaker ambiguity, accents, or other factors. Conceptually, context domain agents 230 may be designed to model utterances as a hard-of-hearing person would at a noisy party. By identifying a context, capabilities within the context, vocabularies within the context, what tasks are done most often historically in the context, what task was just completed, etc., a context domain agent 230 may establish intent from rather meager phonetic clues. Moreover, the context stack may be one of a plurality of components for establishing context, and thus not a constraint upon the user. All context domains may be accessible, allowing the user to switch contexts at any time without confusion. Thus, just as in human-to-human conversation, context domains may be rapidly selected, without menu-driven dead ends, when an utterance is unambiguous. For example, a user may utter, "Please call Rich Kennewick on his cell phone," and a system response of "Do you wish me to call Rich Kennewick on his cell?" may be generated. The user may decide at that point to call Rich Kennewick later, and instead, listen to some music. Thus, the user may then utter, "No, play the Louis Armstrong version of Body and Soul from my iPod," and a system response of "Playing Body and Soul by Louis Armstrong" may be generated as Body and Soul is played through a media player. In this example, the later utterance has no contextual connection to the first utterance, yet because request criteria in the utterances are unambiguous, contexts can be switched easily without relying on the context stack.

Figure 3:
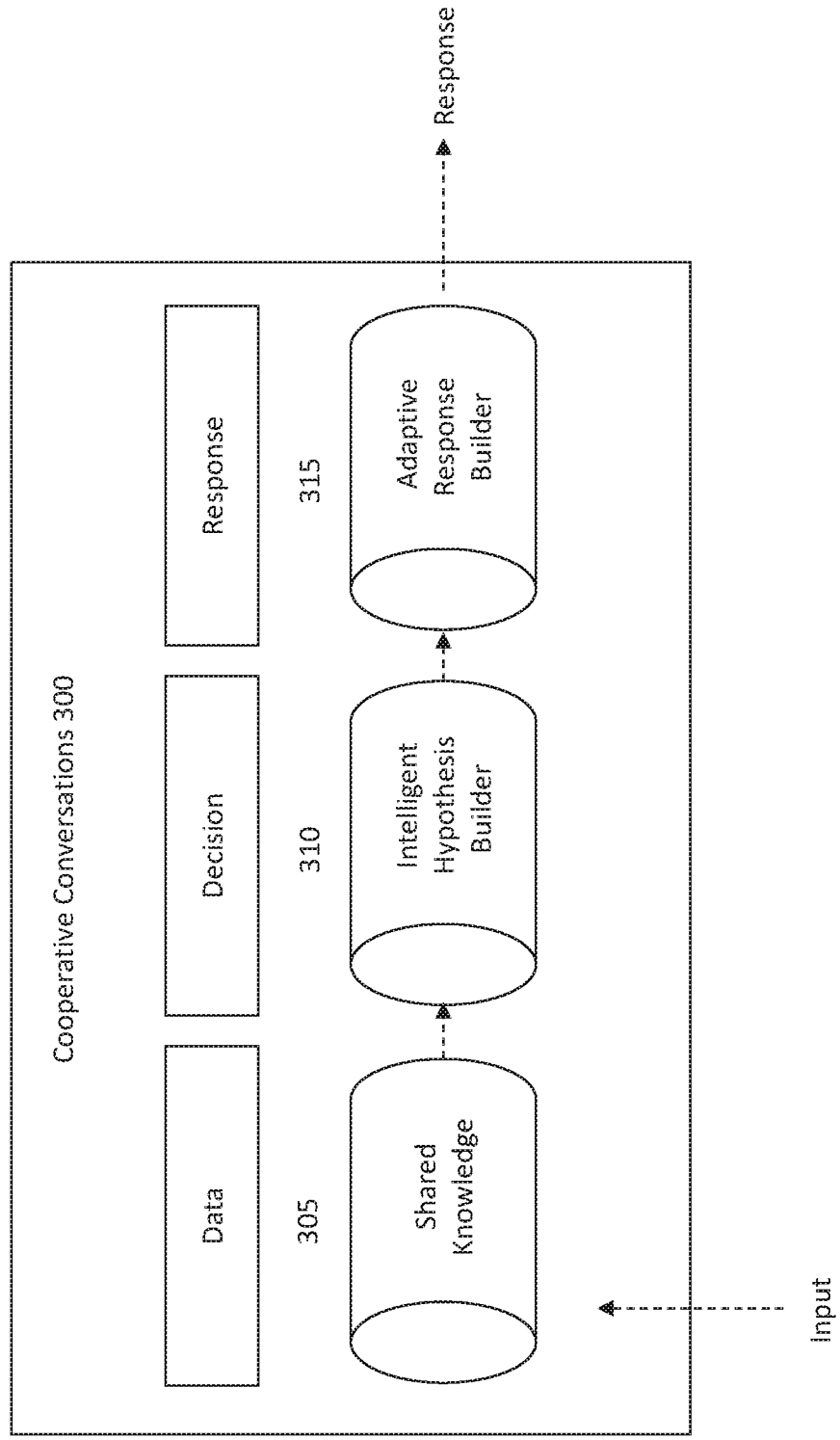
FIG. 3 is an exemplary block diagram of a cooperative conversational model according to one aspect of the invention.

Referring to FIG. 3, an exemplary cooperative conversational model 300 is illustrated according to an aspect of the invention. Cooperative conversational model 300 may build upon free form voice search 245, noise tolerance 250, and context determination 255 to implement a conversational Human-to-Machine interface that reflects how humans interact with each other and their normal behavior in conversation. Simply put, cooperative conversational model 300 enables humans and machines to participate in a conversation with an accepted purpose or direction, with each participant contributing to the conversation for the benefit of the conversation. That is, cooperative conversational model 300 incorporates technology and process-flow that takes advantage of human presumptions about utterances that humans rely upon, both as speakers and listeners, thereby creating a Human-to-Machine interface that is analogous to everyday human-to-human conversation. In one implementation, a cooperative conversation may take incoming data (shared knowledge) 305 to inform a decision (intelligent hypothesis building) 310, and then may refine the decision and generate a response (adaptive response building) 315.

According to one aspect of the invention, shared knowledge 305 includes both short-term and long-term knowledge about incoming data. Short-term knowledge may accumulate during a single conversation, while long-term knowledge may accumulate over time to build user profiles, environmental profiles, historical profiles, cognitive profiles, etc.

Input received during a single conversation may be retained in a Session Input Accumulator. The Session Input Accumulator may include cross-modality awareness, where in addition to accumulating input relating to user utterances, requests, locations, etc., the Session Input Accumulator may accumulate a current user interface state relating to other modal inputs to further build shared knowledge models and more accurate adaptive responses (e.g., when a user utters a request relating to a portion of a touch-screen device, as described above). For example, the Session Input Accumulator may accumulate inputs including recognition text for each utterance, a recorded speech file for each utterance, a list-item selection history, a graphical user interface manipulation history, or other input data. Thus, the Session Input Accumulator may populate Intelligent Hypothesis Builder 310 with current and relevant information, build long-term shared knowledge by identifying information with long-term significance, provide Adaptive Response Builder 315 with relevant state and word usage information, retain recent contexts for use with Intelligent Hypothesis Builder 310, and/or retain utterances for reprocessing during multi-pass evaluations. Moreover, because cooperative conversations 300 model human conversations, short-term session data may be expired after a psychologically appropriate amount of time, thereby humanizing system behavior. For example, a human is unlikely to recall a context of a conversation from two years ago, but because the context would be identifiable by a machine, session context is expired after a predetermined amount of time to reduce a likelihood of contextual confusion based on stale data. However, relevant information from an expired session context may nonetheless be added to user, historical, environmental, cognitive, or other long-term knowledge models.

Long-term shared knowledge may generally be user-centric, rather than session-based. That is, inputs may be accumulated over time to build user, environmental, cognitive, historical, or other long-term knowledge models. Long-term and short-term shared knowledge (collectively, shared knowledge 305) may be used simultaneously anytime a user engages in a cooperative conversation 300. Long-term shared knowledge may include explicit and/or implicit user preferences, a history of most recently used agents, contexts, requests, tasks, etc., user-specific jargon related to vocabularies and/or capabilities of an agent and/or context, most often used word choices, or other information. The long-term shared knowledge may be used to populate Intelligent Hypothesis Builder 310 with current and relevant information, provide Adaptive Response Builder 315 with appropriate word choices when the appropriate word choices are unavailable via the Session Input Accumulator, refine long-term shared knowledge models, identify a frequency of specific tasks, identify tasks a user frequently has difficulty with, or provide other information and/or analysis to generate more accurate conversational responses.

As described above, shared knowledge 305 may be used to populate Intelligent Hypothesis Builder 310, such that a user and a voice user interface may share assumptions and expectations such as topic knowledge, conversation history, word usage, jargon, tone (e.g., formal, humorous, terse, etc.), or other assumptions and/or expectations that facilitate interaction at a Human-to-Machine interface.

According to an aspect of the invention, one component of a successful cooperative conversation may be identifying a type of conversation from an utterance. By categorizing and developing conceptual models for various types of exchanges, user expectations and domain capabilities may be consistently aligned. Intelligent Hypothesis Builder 310 may generate a hypothesis as to a conversation type by considering conversational goals, participant roles, and/or an allocation of information among the participants. Conversational goals may broadly include: (1) getting a discrete piece of information or performing a discrete task, (2) gathering related pieces of information to make a decision, and/or (3) disseminating or gathering large amounts of information to build expertise. Participant roles may broadly include: (1) a leader that controls a conversation, (2) a supporter that follows the leader and provides input as requested, and/or (3) a consumer that uses information. Information may be held by one or more of the participants at the outset of a conversation, where a participant may hold most (or all) of the information, little (or none) of the information, or the information may be allocated roughly equally amongst the participants. Based on the conversational goals, participant roles, and allocation of information, Intelligent Hypothesis Builder 310 may consider various factors to classify a conversation (or utterance) into general types of conversations that can interact with one another to form many more variations and permutations of conversation types (e.g., a conversation type may change dynamically as information is reallocated from one participant to another, or as conversational goals change based on the reallocation of information).

For example, in one implementation, a query conversation may include a conversational goal of getting a discrete piece of information or performing a particular task, where a leader of the query conversation may have a specific goal in mind and may lead the conversation toward achieving the goal. The other participant may hold the information and may support the leader by providing the information. In a didactic conversation, a leader of the conversation may control information desired by a supporter of the conversation. The supporter's role may be limited to regulating an overall progression of the conversation and interjecting queries for clarification. In an exploratory conversation, both participants share leader and supporter roles, and the conversation may have no specific goal, or the goal may be improvised as the conversation progresses. Based on this model, Intelligent Hypothesis Builder 310 may broadly categorize a conversation (or utterance) according to the following diagram:

| QUERY | | |
|---|---|---|
| | Participant A<br>User | Participant B<br>Voice User Interface |
| GOAL | Get information/action | Provide information/action |
| ROLE | Leader/Consumer | Supporter/Dispenser |
| INFORMATION ALLOCATION | Less | More |

| DIDACTIC | | |
|---|---|---|
| | Participant A<br>User | Participant B<br>Voice User Interface |
| GOAL | Get information | Provide information |
| ROLE | Follower/Consumer | Leader/Dispenser |
| INFORMATION ALLOCATION | Less | More |

| EXPLORATORY | | |
|---|---|---|
| | Participant A<br>User | Participant B<br>Voice User Interface |
| GOAL | Gather/share information | Gather/share information |
| ROLE | Follower/Consumer and Leader/Dispenser | Follower/Consumer and Leader/Dispenser |
| INFORMATION ALLOCATION | Equal or alternating | Equal or alternating |

Intelligent Hypothesis Builder 310 may use an identified conversation type to assist in generating a set of hypotheses as to a user's intent in an utterance. In addition, Intelligent Hypothesis Builder 310 may use short-term shared knowledge from the Session Input Accumulator to proactively build and evaluate interaction with a user as a conversation progresses, as well as long-term shared knowledge to proactively build and evaluate interaction with the user over time. Intelligent Hypothesis Builder 310 may thus adaptively arrive at a set of N-best hypotheses about user intent, and the N-best hypotheses may be provided to an Adaptive Response Builder 315. In addition, Intelligent Hypothesis Builder 310 may model human-to-human interaction by calculating a degree of certainty for each of the hypotheses. That is, just as humans rely on knowledge shared by participants to examine how much and what kind of information was available, Intelligent Hypothesis Builder 310 may leverage the identified conversation type and short-term and long-term shared knowledge to generate a degree of certainty for each hypothesis.

According to another aspect of the invention, Intelligent Hypothesis Builder 310 may generate one or more explicit hypotheses of a user's intent when an utterance contains all information (including qualifiers) needed to complete a request or task. Each hypothesis may have a corresponding degree of certainty, which may be used to determine a level of unprompted support to provide in a response. For example, a response may include a confirmation to ensure the utterance was not misunderstood or the response may adaptively prompt a user to provide missing information.

According to another aspect of the invention, Intelligent Hypothesis Builder 310 may use short-term knowledge to generate one or more implicit hypotheses of a user's intent when an utterance may be missing required qualifiers or other information needed to complete a request or task. Each hypothesis may have a corresponding degree of certainty. For instance, when a conversation begins, short-term knowledge stored in the Session Input Accumulator may be empty, and as the conversation progresses, the Session Input Accumulator may build a history of the conversation. Intelligent Hypothesis Builder 310 may use data in the Session Input Accumulator to supplement or infer additional information about a current utterance. For example, Intelligent Hypothesis Builder 310 may evaluate a degree of certainty based on a number of previous requests relevant to the current utterance. In another example, when the current utterance contains insufficient information to complete a request or task, data in the Session Input Accumulator may be used to infer missing information so that a hypothesis can be generated. In still another example, Intelligent Hypothesis Builder 310 may identify syntax and/or grammar to be used by Adaptive Response Builder 315 to formulate personalized and conversational response. In yet another example, when the current utterance contains a threshold amount of information needed to complete a request or task, data in the Session Input Accumulator may be relied upon to tune a degree of certainty.

According to another aspect of the invention, Intelligent Hypothesis Builder 310 may use long-term shared knowledge to generate one or more implicit hypotheses of a user's intent when an utterance is missing qualifiers or other information needed to complete a request or task. Each hypothesis may have a corresponding degree of certainty. Using long-term knowledge may be substantially similar to using short-term shared knowledge, except that information may be unconstrained by a current session, and an input mechanism may include information from additional sources other than conversational sessions. For example, Intelligent Hypothesis Builder 310 may use information from long-term shared knowledge at any time, even when a new conversation is initiated, whereas short-term shared knowledge may be limited to an existing conversation (where no short-term shared knowledge would be available when a new conversation is initiated). Long-term shared knowledge may come from several sources, including user preferences or a plug-in data source (e.g., a subscription interface to a remote database), expertise of a user (e.g., based on a frequency of errors, types of tasks requested, etc., the user may be identified as a novice, intermediate, experienced, or other type of user), agent-specific information and/or language that may also apply to other agents (e.g., by decoupling information from an agent to incorporate the information into other agents), frequently used topics passed in from the Session Input Accumulator, frequently used verbs, nouns, or other parts of speech, and/or other syntax information passed in from the Session Input Accumulator, or other sources of long-term shared knowledge may be used.

According to another aspect of the invention, knowledge-enabled utterances, as generated by Intelligent Hypothesis Builder 310, may include one or more explicit (supplied by a user), and one or more implicit (supplied by Intelligent Hypothesis Builder 310) contextual signifiers, qualifiers, criteria, and other information that can be used to identify and evaluate relevant tasks. At that point, Intelligent Hypothesis Builder 310 may provide an input to Adaptive Response Builder 315. The input received by Adaptive Response Builder 315 may include at least a ranked list of hypotheses, including explicit and/or implicit hypotheses, each of which may have a corresponding degree of certainty. A hypothesis may be assigned one of four degrees of certainty: (1) "sure," where contextual signifiers and qualifiers relate to one task, context and qualifiers relate to one task, and a confidence level associated with a preliminary interpretation generated at the speech recognition engine exceeds a predetermined threshold; (2) "pretty sure," where contextual signifiers and qualifiers relate to more than one task (select top-ranked task) and criteria relates to one request, and/or the confidence level associated with the preliminary interpretation generated at the speech recognition engine is below the predetermined threshold; (3) "not sure," where additional contextual signifiers or qualifiers are needed to indicate or rank a task; and (4) "no hypothesis," where little or no information can be deciphered. Each degree of certainty may further be classified as explicit or implicit, which may be used to adjust a response. The input received by Adaptive Response Builder 310 may also include a context, user syntax and/or grammar, context domain agent specific information and/or preferences (e.g., a travel context domain agent may know a user frequently requests information about France, which may be shared with a movie context domain agent so that responses may occasionally include French movies).

According to another aspect of the invention, Adaptive Response Builder 315 may build syntactically, grammatically, and contextually sensitive "intelligent responses" that can be used with one or more agents to generate a conversational experience for a user, while also guiding the user to reply in a manner favorable for recognition. In one implementation, the intelligent responses may include a verbal or audible reply played through an output device (e.g., a speaker), and/or an action performed by a device, computer, or machine (e.g., downloading a web page, showing a list, executing an application, etc.). In one implementation, an appropriate response may not require conversational adaptation, and default replies and/or randomly selected response sets for a given task may be used.

According to another aspect of the invention, Adaptive Response Builder 310 may draw on information maintained by Intelligence Hypothesis Builder 310 to generate responses that may be sensitive to context, task recognition of a current utterance, what a user already knows about a topic, what an application already knows about the topic, shared knowledge regarding user preferences and/or related topics, appropriate contextual word usage (e.g., jargon), words uttered by the user in recent utterances, conversational development and/or course correction, conversational tone, type of conversation, natural variation in wording of responses, or other information. As a result, Adaptive Response Builder 315 may generate intelligent responses that create conversational feel, adapt to information that accumulates over a duration of a conversation, maintain cross-modal awareness, and keep the conversation on course.

According to another aspect of the invention, Adaptive Response Builder 315 may create a conversational feel by adapting to a user's manner of speaking, framing responses appropriately, and having natural variation and/or personality (e.g., by varying tone, pace, timing, inflection, word use, jargon, and other variables in a verbal or audible response). Adapting to a user's manner of speaking may include using contextual signifiers and grammatical rules to generate one or more sentences for use as response sets that may cooperate with the user. By taking advantage of short-term (from the Session Input Accumulator) and long-term (from one or more profiles) shared knowledge about how a user utters a request, the responses may be modeled using techniques used to recognize requests. Adaptive Response Builder 315 may rate possible responses statistically and/or randomize responses, which creates an opportunity to build an exchange with natural variation and conversational feel. This may be a significant advantage over existing voice user interfaces with incongruous input and output, where the input is "conversational" and the output is "computerese." The following examples may demonstrate how a response may adapt to a user's input word choices and manner of speaking:

| User | Do you know [mumbled words] Seattle [more mumbled words]? |
| --- | --- |
| Voice User Interface | Did you want Seattle sports scores, weather, traffic, or news? |

| User | Find me [mumbled words] Seattle [more mumbled words]? |
| --- | --- |
| Voice User Interface | I found Seattle, did you want sports scores, weather, traffic, or news? |

| User | Get me [mumbled words] Seattle [more mumbled words]? |
| --- | --- |
| Voice User Interface | I've got Seattle, did you want me to get sports scores, weather, traffic, or news? |

According to another aspect of the invention, Adaptive Response Builder 315 may frame responses to influence a user to reply with an utterance that may be easily recognized. For example, a user may utter, "Get me the news" and a voice user interface response may be "Which of these categories? Top news stories, international news, political news, or sports news?" The response may be likely to illicit utterances from the user, such as "Top news stories" or "International news," which are more likely to result in a completed request. Thus, the responses may conform to a cooperative nature of human dialog, and a natural human tendency to "parrot" what was just heard as part of a next utterance. Moreover, knowledge of current context may enhance responses to generate more meaningful conversational responses, such as in the following exchange:

| User | What's the weather like in Dallas? |
| --- | --- |
| Voice User Interface | In Dallas, it's sunny and 90 degrees. |
| User | What theaters are showing the movie "The Fantastic Four" there? |
| Voice User Interface | 10 theaters in Dallas are showing "The Fantastic Four." Do you want show times for a particular theater? |

Framing the responses may also deal with misrecognitions according to human models. For example, humans frequently remember a number of recent utterances, especially when one or more previous utterances were misrecognized or unrecognized. Another participant in the conversation may limit correction to a part of the utterance that was misrecognized or unrecognized, or over subsequent utterances and/or other interactions, clues may be provided to indicate the initial interpretation was incorrect. Thus, by storing and analyzing multiple utterances, utterances from earlier in a conversation may be corrected as the conversation progresses.

According to another aspect of the invention, Adaptive Response Builder 315 may generate multi-modal, or cross-modal, responses to a user. In one implementation, responses may be aware of and control one or more devices and/or interfaces, and users may respond by using whichever input method, or combination of input methods, is most convenient. For example, a response asking the user to direct an utterance with a "Yes" or "No" in a multi-modal environment may also display alternatives visually.

According to another aspect of the invention, Adaptive Response Builder 315 may correct a course of a conversation without interrupting conversational flow. Adaptive Response Builder 315 may generate intelligent responses based on the ranked list of hypotheses and corresponding degrees of certainty, which may be used to correct a course of a conversation without interrupting conversational flow. That is, even though the intelligent responses may be reasonably "sure," the intelligent responses may nonetheless sometimes be incorrect. While existing voice user interfaces tend to fail on average conversational missteps, normal human interactions may expect missteps and deal with them appropriately. Thus, responses after a misrecognition may be modeled after clarifications, rather than errors, and words may be chosen in subsequent responses that move conversation forward and establish an appropriate domain to be explored with the user. For example, course correction may result in the following exchange:

| User | Can you get [mumbled words here] Mariners [more mumbled words]? |
| --- | --- |
| Voice User Interface | I've got the score for the Mariners game? 4-2 Mariners. |
| User | No, the start time for tomorrow's game. |
| Voice User Interface | Oh, 7:05. |

The above disclosure has been described in terms of specific exemplary aspects, implementations, and embodiments of the invention. However, those skilled in the art will recognize various changes and modifications that may be made without departing from the scope and spirit of the invention. Therefore, the specification and drawings are to be regarded as exemplary only, and the scope of the invention is to be determined solely by the appended claims.

What is claimed is:

1. A computer-implemented method of facilitating natural language system responses utilizing a context stack generated based on multiple prior natural language utterances received, the method being implemented by a computer system that includes one or more physical processors executing one or more computer program instructions which, when executed, perform the method, the method comprising:

tracking, by the computer system, a series of contexts respectively identified for a series of natural language utterances received by the computer system during a current conversation, the series of contexts comprising at least a first context identified for a first utterance at a first time and a second context identified for a second utterance at a second time after the first time;

generating, by the computer system, a context stack based on the tracked contexts comprising the series of contexts in reverse chronological order of a time of identification by the computer system, wherein the second context is listed before the first context;

receiving, at the computer system and as part of the current conversation, a third natural language utterance from an input device at a third time after the second time;

determining, by the computer system, whether the third natural language utterance corresponds to one or more of the series of contexts in the generated context stack by comparing the third natural language utterance to one or more of the series of contexts in the order the series of contexts are listed in the generated context stack; and responsive to a determination that the third natural language utterance corresponds to one or more of the series of contexts in the generated context stack, interpreting, by the computer system, the third natural language utterance using the corresponding one or more contexts.

2. The method of claim 1, the method further comprising: generating, by the computer system, a response to the third natural language utterance based on the interpretation.

3. The method of claim 1, wherein determining whether the third natural language utterance corresponds to one or more of the series of contexts in the generated context stack comprises:
identifying, by the computer system, one or more of the series of contexts in the generated context stack based on one or more recognized words of the third natural language utterance.

4. The method of claim 1, wherein determining whether the third natural language utterance corresponds to one or more of the series of contexts in the generated context stack comprises:
determining, by the computer system, whether the third natural language utterance corresponds to a most recent context of the series of contexts in the generated context stack; and
responsive to a determination that the third natural language utterance does not correspond to the most recent context, determining, by the computer system, whether the third natural language utterance corresponds to a second most recent context of the series of contexts in the generated context stack.

5. The method of claim 1, the method further comprising: responsive to a determination that the third natural language utterance does not correspond to one or more of the series of contexts in the generated context stack, determining, by the computer system, a third context for the third natural language utterance based on one or more recognized words of the third natural language utterance;
updating, by the computer system, the generated context stack based on the third context by placing the third context first;
receiving, at the computer system, a fourth natural language utterance;
responsive to a determination that the fourth natural language utterance corresponds to one or more of the series of contexts in the updated context stack, interpreting, by the computer system, the fourth natural language utterance using the corresponding one or more contexts in the updated context stack; and
generating, by the computer system, a response to the fourth natural language utterance based on the interpretation of the fourth natural language utterance.

6. The method of claim 1, the method further comprising: accumulating, by the computer system, short-term knowledge, wherein the short-term knowledge is accumulated based on one or more of the series of natural language utterances received by the computer system during a predetermined time period.

7. The method of claim 6, wherein the determination that the third natural language utterance corresponds to one or more of the series of contexts in the generated context stack is based on the short-term knowledge.

8. The method of claim 6, the method further comprising: responsive to a determination that the third natural language utterance does not correspond to one or more of the series of contexts in the generated context stack, determining, by the computer system, a third context for the third natural language utterance based on the short-term knowledge;
interpreting, by the computer system, based on the third context, the third natural language utterance; and
generating, by the computer system, a response to the third natural language utterance based on the interpretation of the third natural language utterance based on the third context.

9. The method of claim 1, wherein: the series of contexts further comprises a fourth context identified for a fourth utterance at a fourth time after the second time and before the third time; and, in the generated context stack, the fourth context is listed before the second context.

10. A system for facilitating natural language system responses utilizing a context stack generated based on multiple prior natural language utterances received, the system comprising:
one or more physical processors programmed with one or more computer program instructions which, when executed, configure the one or more physical processors to:
track a series of contexts respectively identified for a series of natural language utterances received by the system during a current conversation, the series of contexts comprising at least a first context identified for a first utterance at a first time and a second context identified for a second utterance at a second time after the first time;
generate a context stack based on the tracked contexts comprising the series of contexts in reverse chronological order of a time of identification by the computer system, wherein the second context is listed before the first context;
receive a third natural language utterance from an input device as part of the current conversation at a third time after the second time;
determine whether the third natural language utterance corresponds to one or more of the series of contexts in the generated context stack by comparing the third natural language utterance to one or more of the series of contexts in the order the series of contexts are listed in the generated context stack; and
responsive to a determination that the third natural language utterance corresponds to one or more of the series of contexts in the generated context stack, interpret the third natural language utterance using the corresponding one or more contexts.

11. The system of claim 10, wherein the one or more physical processors are further configured to:
generate a response to the third natural language utterance based on the interpretation.

12. The system of claim 10, wherein to determine whether the third natural language utterance corresponds to one or more of the series of contexts in the generated context stack, the one or more physical processors are configured to:
identify one or more of the series of contexts in the generated context stack based on one or more recognized words of the third natural language utterance.

13. The system of claim 10, wherein to determine whether the third natural language utterance corresponds to one or more of the series of contexts in the generated context stack, the one or more physical processors are configured to:
determine whether the third natural language utterance corresponds to a most recent context of the series of contexts in the generated context stack; and responsive to a determination that the third natural language utterance does not correspond to the most recent context, determine whether the third natural language utterance corresponds to a second most recent context of the series of contexts in the generated context stack.

14. The system of claim 10, wherein the one or more physical processors are further configured to:
responsive to a determination that the third natural language utterance does not correspond to one or more of the series of contexts in the generated context stack, determine a third context for the third natural language utterance based on one or more recognized words of the third natural language utterance;
update the generated context stack based on the third context by placing the third context first;
receive a fourth natural language utterance;
responsive to a determination that the fourth natural language utterance corresponds to one or more of the series of contexts in the updated context stack, interpret the fourth natural language utterance using the corresponding one or more contexts in the updated context stack; and
generate a response to the fourth natural language utterance based on the interpretation of the fourth natural language utterance.

15. The system of claim 10, wherein the one or more physical processors are further configured to:
accumulate short-term knowledge, wherein the short-term knowledge is accumulated based on one or more of the series of natural language utterances received by the system during a predetermined time period.

16. The system of claim 15, wherein the determination that the third natural language utterance corresponds to one or more of the series of contexts in the generated context stack is based on the short-term knowledge.

17. The system of claim 15, wherein the one or more physical processors are further configured to:
responsive to a determination that the third natural language utterance does not correspond to one or more of the series of contexts in the generated context stack, determine a third context for the third natural language utterance based on the short-term knowledge;
interpret the third natural language utterance based on the third context; and
generate a response to the third natural language utterance based on the interpretation of the third natural language utterance based on the third context.

18. The system of claim 10, wherein: the series of contexts further comprises a fourth context identified for a fourth utterance at a fourth time after the second time and before the third time; and, in the generated context stack, the fourth context is listed before the second context.

* * * * *